US007783572B2

(12) United States Patent
Fang et al.

(10) Patent No.: US 7,783,572 B2
(45) Date of Patent: Aug. 24, 2010

(54) APPARATUS AND METHOD FOR DOWNLOADING CONFIGURATION DATA TO CARD TERMINALS AND FOR VIEWING ACTIVITY AT CARD TERMINALS

(75) Inventors: Ming-Sum Fang, Plano, TX (US); Alan J. Sims, Carrollton, TX (US)

(73) Assignee: Heartland Payment Systems, Inc., Princeton, NJ (US)

( * ) Notice: Subject to any disclaimer, the term of this patent is extended or adjusted under 35 U.S.C. 154(b) by 2068 days.

(21) Appl. No.: 09/993,767

(22) Filed: Nov. 27, 2001

(65) Prior Publication Data
US 2003/0101145 A1 May 29, 2003

(51) Int. Cl.
G06F 21/00 (2006.01)
G06Q 20/00 (2006.01)

(52) U.S. Cl. .............................. 705/50; 705/65; 705/68; 705/75

(58) Field of Classification Search .................... 705/41, 705/71, 75, 26, 50, 65, 68; 709/220; 235/492; 710/104; 379/93.02; 713/164
See application file for complete search history.

(56) References Cited

U.S. PATENT DOCUMENTS

| 4,532,416 | A | 7/1985 | Berstein | 235/379 |
|---|---|---|---|---|
| 5,357,563 | A | 10/1994 | Hamilton et al. | 379/91 |
| 5,396,545 | A | 3/1995 | Nair et al. | 379/91 |
| 5,869,821 | A | 2/1999 | Lee et al. | 235/380 |
| 6,135,349 | A | 10/2000 | Zirkel | 235/375 |
| 6,185,542 | B1 | 2/2001 | Moran et al. | 705/16 |
| 6,230,145 | B1 | 5/2001 | Verderamo et al. | 705/35 |
| 6,234,389 | B1 * | 5/2001 | Valliani et al. | 235/380 |
| 6,289,368 | B1 | 9/2001 | Dentler et al. | 709/101 |
| 6,507,909 | B1 * | 1/2003 | Zurko et al. | 713/164 |
| 6,644,553 | B1 * | 11/2003 | Ohki et al. | 235/492 |
| 6,707,892 | B2 * | 3/2004 | Kawagishi | 705/41 |
| 6,877,093 | B1 * | 4/2005 | Desai et al. | 713/156 |
| 6,963,908 | B1 * | 11/2005 | Lynch et al. | 709/220 |
| 2002/0026549 | A1 * | 2/2002 | Powers et al. | 710/104 |
| 2002/0080935 | A1 * | 6/2002 | Kawagishi | 379/93.02 |

FOREIGN PATENT DOCUMENTS

JP             09193577       *    7/1997

* cited by examiner

Primary Examiner—Charles C Agwumezie
(74) Attorney, Agent, or Firm—Potomac Patent Group PLLC

(57) ABSTRACT

Downloading configuration data to program card terminals and providing real-time data of activity occurring at card terminals. A merchant can log on to a system server and enter information to program options for its card terminals such as via a web page on an Internet site. The system server formats the information into a file based upon a communication protocol and programming rules for the card terminal, and downloads the file to it as a data stream. The card terminal programs itself according to the configuration data. A merchant can also view data for activity occurring at its card terminals, possibly in real-time proximate to detection of the activity by the system server. In conjunction with processing transactions or other activity from the card terminals, the system server replicates the records for the activity and makes them available to merchants such as via a web page on an Internet site. Both the entry of configuration data and viewing of real-time activity can occur at a network connection remote from the card terminals, allowing the merchants to program the card terminals and view their activity at any location having network access.

40 Claims, 23 Drawing Sheets

HPS Merchant Batches

Batches Returned 21
Showing Batches 1 through 21
Batch Listing for Merchant 650002200000056 - CAFE AMORE PLANO

| Batch Nbr | Term Id | Batch Status | Create Date | Close Date | Close Time | Sales Count | Sales Amount | Rtn/Adj Count | Rtn/Adj Amount | Adj Count | Adj Amount | Total Count | Net |
|---|---|---|---|---|---|---|---|---|---|---|---|---|---|
| Open | 1 | Open | 8/24/2001 | | | 0 | 0 | $0.00 | 0 | $0.00 | 0 | $0.00 | 0 | $0.00 |
| 000021 | 1 | Closed | 8/24/2001 | 8/24/2001 | 14:33:10 | 1 | $52.38 | 0 | $0.00 | 1 | $28.19 | 2 | $28.19 |
| 000020 | 1 | Closed | 8/24/2001 | 8/24/2001 | 14:25:02 | 11 | $300.88 | 0 | $0.00 | 6 | $112.72 | 17 | $202.40 |
| 000019 | 1 | Closed | 8/23/2001 | 8/23/2001 | 22:27:22 | 32 | $1,274.38 | 0 | $0.00 | 28 | $662.52 | 60 | $717.95 |
| 000018 | 1 | Closed | 8/22/2001 | 8/22/2001 | 21:59:00 | 28 | $1,163.50 | 0 | $0.00 | 21 | $584.76 | 49 | $686.47 |
| 000017 | 1 | Closed | 8/21/2001 | 8/21/2001 | 22:02:48 | 27 | $934.95 | 0 | $0.00 | 19 | $431.37 | 46 | $564.89 |
| 000016 | 1 | Closed | 8/20/2001 | 8/20/2001 | 22:43:15 | 33 | $1,207.81 | 0 | $0.00 | 25 | $556.88 | 58 | $737.43 |
| 000015 | 1 | Closed | 8/19/2001 | 8/19/2001 | 21:38:22 | 47 | $2,372.91 | 0 | $0.00 | 40 | $1,221.95 | 87 | $1,327.22 |
| 000014 | 1 | Closed | 8/18/2001 | 8/18/2001 | 22:41:10 | 40 | $1,961.75 | 0 | $0.00 | 34 | $996.18 | 74 | $1,112.65 |
| 000013 | 1 | Closed | 8/17/2001 | 8/17/2001 | 22:46:12 | 60 | $2,600.91 | 0 | $0.00 | 43 | $1,231.08 | 103 | $1,546.05 |
| 000012 | 1 | Closed | 8/16/2001 | 8/16/2001 | 22:40:19 | 28 | $1,622.32 | 0 | $0.00 | 20 | $797.62 | 48 | $926.83 |
| 000011 | 1 | Closed | 8/15/2001 | 8/15/2001 | 21:47:30 | 40 | $1,805.54 | 0 | $0.00 | 34 | $920.01 | 74 | $1,017.38 |
| 000010 | 1 | Closed | 8/14/2001 | 8/14/2001 | 22:07:07 | 31 | $1,508.56 | 0 | $0.00 | 25 | $732.72 | 56 | $882.89 |
| 000009 | 1 | Closed | 8/13/2001 | 8/13/2001 | 21:41:01 | 28 | $839.30 | 0 | $0.00 | 16 | $365.19 | 44 | $530.31 |
| 000008 | 1 | Closed | 8/12/2001 | 8/12/2001 | 21:09:23 | 47 | $2,297.94 | 0 | $0.00 | 39 | $1,120.90 | 86 | $1,349.37 |
| 000006 | 1 | Closed | 8/11/2001 | 8/11/2001 | 23:21:52 | 46 | $2,727.60 | 0 | $0.00 | 39 | $1,387.60 | 85 | $1,539.84 |
| 000005 | 1 | Closed | 8/10/2001 | 8/10/2001 | 22:59:23 | 66 | $3,312.27 | 0 | $0.00 | 54 | $1,648.16 | 120 | $1,925.94 |
| 000004 | 1 | Closed | 8/9/2001 | 8/9/2001 | 22:20:39 | 47 | $1,680.25 | 0 | $0.00 | 35 | $825.78 | 82 | $979.50 |
| 000003 | 1 | Closed | 8/8/2001 | 8/9/2001 | 11:07:20 | 1 | $2.10 | 0 | $0.00 | 1 | $1.10 | 2 | $1.10 |

…
APPARATUS AND METHOD FOR DOWNLOADING CONFIGURATION DATA TO CARD TERMINALS AND FOR VIEWING ACTIVITY AT CARD TERMINALS

FIELD OF THE INVENTION

The present invention relates to an apparatus and method for triggering the downloading of information or an application to a card terminal via a network and for monitoring transaction data or other activity across card terminals via a network.

BACKGROUND OF THE INVENTION

Card terminals are used at merchant sites for processing credit card transactions. To make a credit card payment, a customer's credit card is "swiped" through the card terminal in order to read a magnetic stripe on the card, and an amount of the transaction is manually keyed into the card terminal. The card terminal dials up a server and, using the encoded information from the magnetic stripe along with the entered amount, requests authorization for the transaction. The server may contact other entities, such as a card issuer, and perform processing to determine whether to authorize or deny the requested transaction. If authorized, the server transmits an authorization code back to the card terminal, which indicates approval of the transaction. The card terminal prints a receipt, which the customer can sign to complete the transaction. Certain types of card terminals can alternatively capture an electronic signature of the customer.

Card terminals are programmed by each individual merchant. For example, the card terminal is programmed to print the name and address of the merchant on the receipt. For certain types of merchants, such as restaurants, the card terminal can be programmed to print lines on the receipt for the customer to enter a tip amount and a total amount for the transaction. Also, card terminals can be programmed to print various other messages on the receipts. In addition to options involving the receipts, card terminals can be programmed to configure other options as well.

In order to program a card terminal, a merchant must be physically proximate the card terminal in order to program the options. The programming can also require particular technical knowledge or skill concerning the card terminals in order to know how to program them. A merchant may thus be less likely to frequently change configuration options for card terminals and does not necessarily have an easy way to make such changes.

Also, merchants can be provided with reports concerning transactions at their card terminals. However, the reports represent past activity and thus do not provide an indication of activity across card terminals proximate the time when they occur. The reports are not necessarily easily or widely accessible either, potentially lessening the value of them.

Accordingly, what is needed are easier ways to program card terminals and more versatility in providing information concerning transactions at card terminals.

SUMMARY OF THE INVENTION

A method and apparatus consistent with the present invention provide a message for use in downloading an application to a card terminal via a network. A request to download an application to a particular card terminal is received via a network and is translated into a format corresponding to the particular card terminal. The request can include information for programming the card terminal with configuration options and be entered via a network connection remote from the card terminal. A message related to the translated request is transmitted to the particular card terminal upon detecting a particular activity at it such as closing of a batch or can be transmitted without waiting for detection of the activity. The message can be used for triggering downloading of the application to the card terminal.

Another method and apparatus consistent with the present invention provide information via a network concerning activity at a card terminal. Upon detecting activity at a card terminal, information concerning the activity is generated for network transmission and display. The activity may include information relating to a processed batch or transaction at the card terminal. The information is transmitted to a particular user at a network connection remote from the card terminal.

BRIEF DESCRIPTION OF THE DRAWINGS

The accompanying drawings are incorporated in and constitute a part of this specification and, together with the description, explain the advantages and principles of the invention. In the drawings.

FIG. 11 is a diagram of a merchant viewer screen;

FIGS. 16, 17, and 18 are a diagram of a terminal options screen for a second type of exemplary card terminal;

FIG. 20 is a diagram of a batches screen;

FIG. 21 is a diagram of a transaction information screen;

DETAILED DESCRIPTION

Overview

Figure 1A:
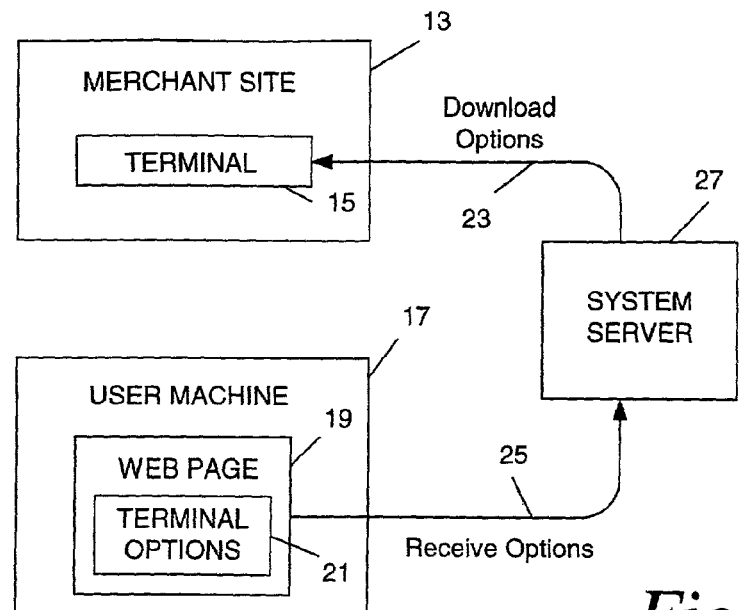
FIG. 1A is a diagram illustrating downloading of an application or information to a card terminal via a network connection remote from the card terminal.

FIG. 1A is a diagram conceptually illustrating downloading of information to a card terminal via a network connection remote from it. A merchant or other user at a machine 17 can enter terminal options into a web page 19, for example, using a conventional browser. The terminal options 21 are intended for a card terminal 15 at a merchant site 13, possibly physically remote from the user machine 17 or proximate to it. A system server 27 receives 25 the options transmitted over a network by the user, as well as an identification of the corresponding card terminal 15 to be configured according to the options. The system server 27 converts the options from the format received via the web page or other source into a suitable format for the card terminal 15, which depends upon a particular protocol for communicating with the terminal and rules for programming it. The system server 27 downloads 23 configuration data for the options to the card terminal 15 over a network, and the card terminal 15 reconfigures itself using the configuration data.

Therefore, a user can configure options for a terminal via a network, such as the Internet, using a user-friendly interface and need not necessarily be physically proximate the card terminal. For example, at any location having network access, the user can log on to the system server site via the Internet or other network and enter options for the terminal. The user can also enter the options at the merchant site having the card terminal, but again can enter the options via a user-friendly interface, for example, using a conventional browser or other program. Therefore, a merchant needs only a network connection and browser, for example, to configure the merchant's card terminals and can possibly perform the configuration at locations physically remote from the merchant site or at the site.

Figure 1B:
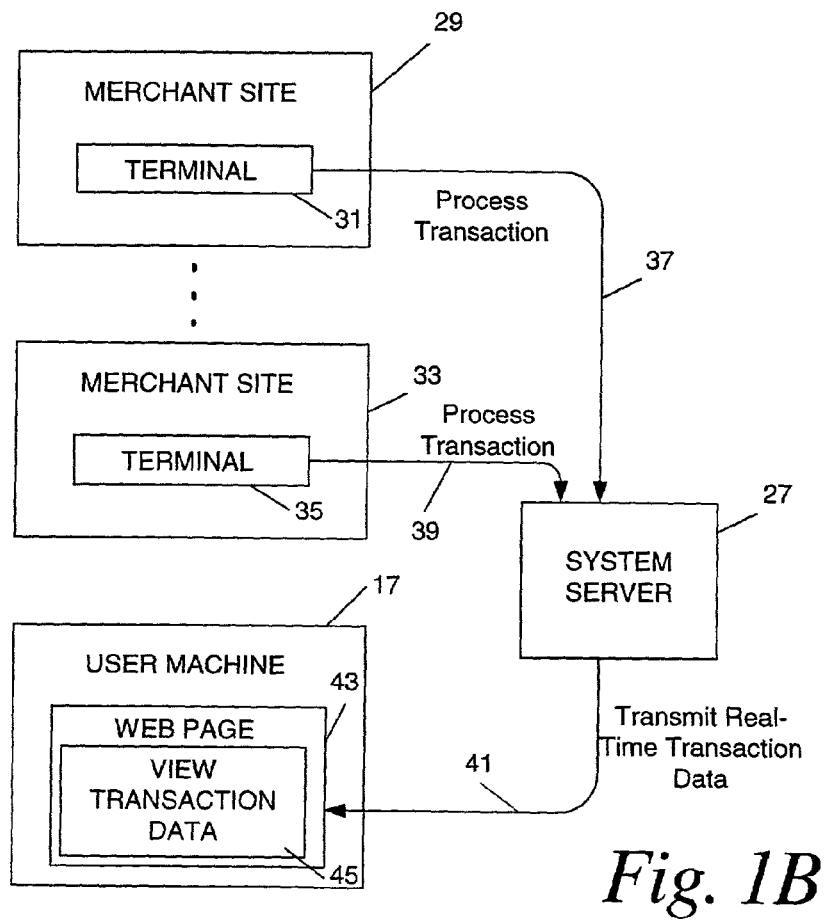
FIG. 1B is a diagram illustrating providing transaction data or other activity from card terminals to a network connection remote from them.

FIG. 1B is a diagram conceptually illustrating providing information concerning activity at card terminals to a network connection remote from them. The system server 27 receives 37 and 39 transaction data for processing from card terminals 31 and 35 at merchant sites 29 and 33, respectively. It can contact other servers or entities, such as card issuers, to process the transactions, which typically involves approving or denying the transaction and arranging for the transfer of funds for approved transactions. In conjunction with processing the transactions, the system server 27 replicates the transaction data into data structures. It can use those data structures to transmit 41 real-time transaction data 45 formatted in a web page 43, for example, to the user machine 17.

The user can view the transaction data using, for example, a conventional browser and connection to the Internet or other network. The system server can provide the transaction data in real-time, meaning that it provides the data close in time to the processing of it, allowing for brief processing time such as, for example, a few seconds. As long as the user remains logged on to the system server site, the system server can continually refresh web page 43 to provide transaction data from one or more card terminals close to time to the processing of the transactions. Therefore, a merchant can view data from transactions occurring at the merchant's card terminals, close in time to the actual processing of them, and can view the data from any location having network access. In addition to transaction data, the same methodology and system can be used to view any activity occurring at the card terminals.

In both FIGS. 1A and 1B, the use of a network connection remote from the card terminals refers to a network connection separate from the connection to the card terminal. The network connection is thus "remote" in the sense that it typically uses a different connection, although the connection can occur physically proximate the card terminal or distant from it. For example, a user can be logged on to the Internet at the merchant site in order to view activity occurring at a card terminal at the site, or the user can be logged on to the Internet at physically distant office to view the same activity. As one such example, a manager of a chain of nation-wide restaurants can view at a central office activity at card terminals in all of the restaurants. This example is provided for illustrative purposes only, and many other exemplary implementations are possible.

System Components

Figure 2:
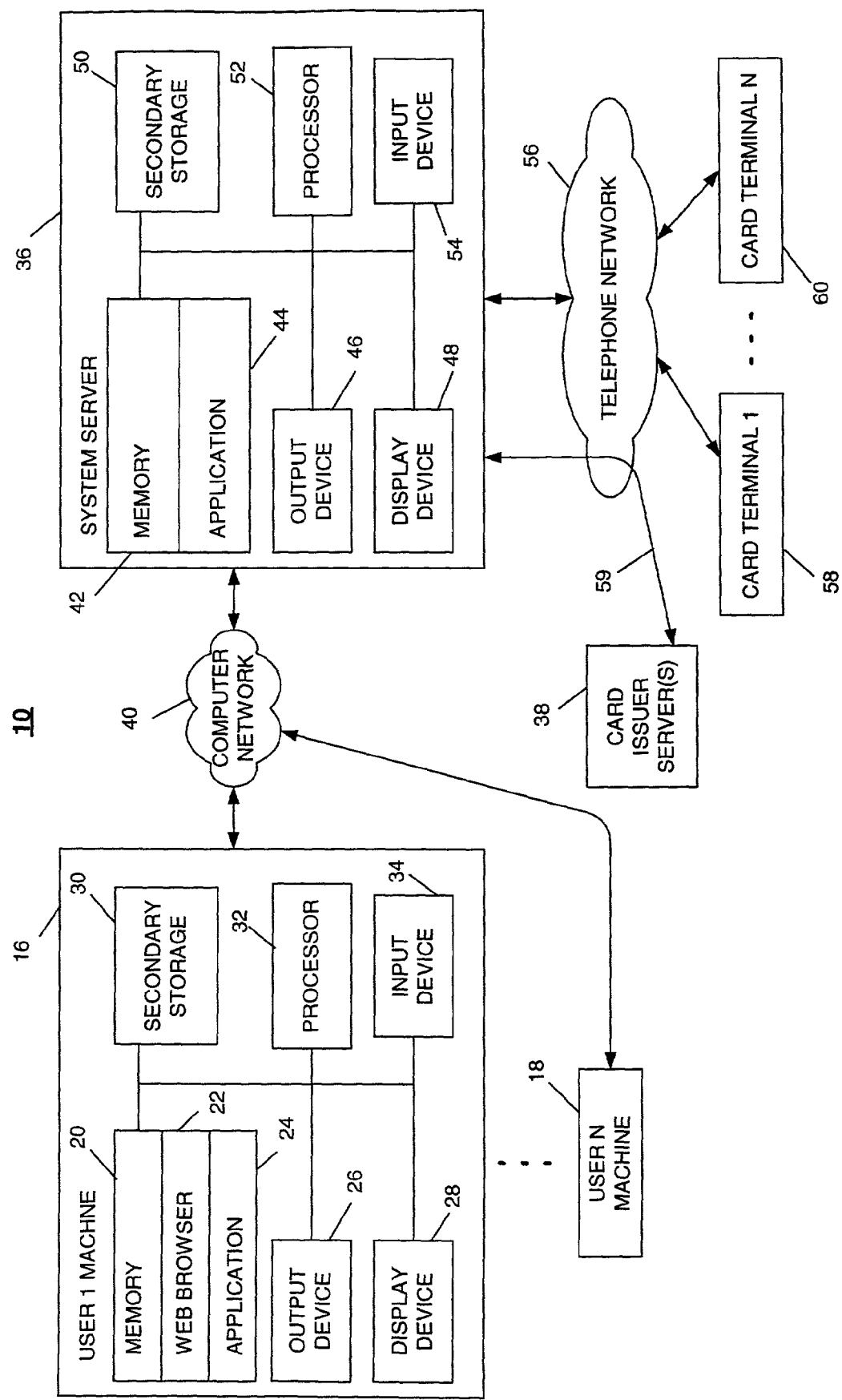
FIG. 2 is a diagram of a system for downloading an application or information to card terminals and providing information concerning activity at them.

FIG. 2 is a diagram of a system 10 for downloading an application or information to card terminals and providing for monitoring of activity at the card terminals. System 10 includes user machines 16 and 18 connected with a computer network 40 such as the Internet or other type of network. Network 40 may include, for example, a network operating according to the Transmission Control Protocol/Internet Protocol (TCP/IP). A system server 36 is connected with network 40 and can be accessed by user machines 16 and 18 to trigger download of an application or information to card terminals or view information concerning activity at them. Only two user machines are shown for illustrative purposes only; system 10 may include many user machines and may be scalable to add or delete user machines to or from the network.

System server 36 can communicate via telephone network 56 with one or more servers 38 for a card issuer, such as Visa or American Express. This communication typically occurs over a dedicated line, as represented by line 59, although it may alternatively occur through computer network 40. The card issue servers 38 provide authorizations for the credit card or other transactions and can provide for the transfer of funds from the issuing bank to the merchant bank.

User machine 16 illustrates typical components of a user machine. User machine 16 typically includes a memory 20, a secondary storage device 30, a processor 32, an input device 34, a display device 28, and an output device 26. Memory 20 may include random access memory (RAM) or similar types of memory, and it may store one or more applications, such as application 24, and a web browser 22, for execution by processor 32.

Secondary storage device 30 may include a hard disk drive, floppy disk drive, CD-ROM drive, or other types of non-volatile data storage. Processor 32 may execute applications or programs stored in memory 20 or secondary storage 30, or received from the Internet or other network 40. Input device 34 may include any device for entering information into machine 16, such as a microphone, digital camera, video recorder or camcorder, keyboard, cursor-control device, or touch-screen. Display device 28 may include any type of device for presenting visual information such as, for example, a computer monitor, flat-screen display, or display panel. Output device 26 may include any type of device for presenting a hard copy of information, such as a printer, and other types of output devices include speakers or any device for providing information in audio form.

Web browser 22, possibly in conjunction with application 24, is used to access information via network 40 and display it in web pages, and examples of those pages are shown in the screens provided in FIGS. 9-23. Examples of web browsers include the Netscape Navigator program and the Microsoft Internet Explorer program. Any web browser or other application capable of retrieving content from a network and displaying pages or screens may be used.

User machine 18 may include the same components as user machine 16. Therefore, examples of user machines include personal computers, laptop computers, notebook computers, palm top computers, network computers, or any processor-controlled device capable of executing a web browser or other type of application for interacting with the system.

System server 36 typically includes a memory 42, a secondary storage device 50, a processor 52, an input device 54, a display device 48, and an output device 46. Memory 42 may include RAM or similar types of memory, and it may store one or more applications 44 for execution by processor 52. Secondary storage device 50 may include a hard disk drive, floppy disk drive, CD-ROM drive, or other types of nonvolatile data storage. Processor 52 may execute one or more applications or programs stored in memory 42 or secondary storage 50, or received from the Internet or other network 40. Input device 54 may include any device for entering information into server 36, such as a microphone, digital camera, video recorder or camcorder, keyboard, cursor-control device, or touch-screen. Display device 48 may include any type of device for presenting visual information such as, for example, a computer monitor, flat-screen display, or display panel. Output device 46 may include any type of device for presenting a hard copy of information, such as a printer, and other types of output devices include speakers or any device for providing information in audio form.

System server 36 stores a database structure in secondary storage 50, for example, for storing and maintaining information concerning merchants, card terminals, configuration options for the card terminals, and activity at the card terminals. Processor 52 may execute one or more applications 44 in order to provide information to browser 22, possibly in conjunction with application 24, and to provide the web pages shown in the screens of FIGS. 9-23. Although only one server is shown, system 10 may use multiple servers as necessary or desired to support the users and may also use back-up or redundant servers to prevent network downtime in the event of a failure of a particular server.

Although machine 16 and server 36 are depicted with various components, one skilled in the art will appreciate that these machines and the server can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as machine 16 and system server 36, to perform a particular method.

FIGS. 9-23 are screens illustrating how users and may interact with the system, and these screens may be displayed on display devices associated with the users' computers. The term "screen" refers to any visual element or combinations of visual elements for displaying information; examples include, but are not limited to, user interfaces on a display device or information displayed in web pages or in windows on a display device. The screens may be formatted, for example, as web pages in HyperText Markup Language (HTML), or in any other suitable form for presentation on a display device depending upon applications used by users to interact with the system.

The screens include various sections, as explained below, to provide information or to receive information or commands. The term "section" with respect to screens refers to a particular portion of a screen, possibly including the entire screen. Sections are selected, for example, to enter information or commands or to retrieve information or access other screens. The selection may occur, for example, by using a cursor-control device to "click on" or "double click on" the section; alternatively, sections may be selected by entering a series of key strokes or in other ways such as through voice commands or use of a touch screen. In addition, although the screens shown in FIGS. 9-23 illustrate a particular arrangement and number of sections in each screen, other arrangements are possible and different numbers of sections in the screens may be used to accomplish the same or similar functions of displaying information and receiving information or commands. Also, the same section may be used for performing a number of functions, such as both displaying information and receiving a command. The processing to support the screens in FIGS. 9-23 is shown in the flow charts of FIGS. 4-8. The processing may be implemented in software, such as software modules, for execution by computers or other machines.

System server 36 can communicate with card terminals, as represented by card terminals 58 and 60, via a telephone network 56. Each card terminal can be associated with a unique telephone number, and system server 36 can thus communicate with a specific card terminal using a dial-up connection through any wireline or wireless telephone network. Once system server 36 dials-up a particular card terminal 58 or 60, it can communicate with the card terminal using known protocols and programming rules depending upon the type of card terminal contacted.

Computer network 40 and telephone network 56 can possibly use or be implemented with at least some of the same physical components, and use different communication protocols. Each network can make use of any wireline or wireless medium for implementing the communication protocols.

Figure 3:
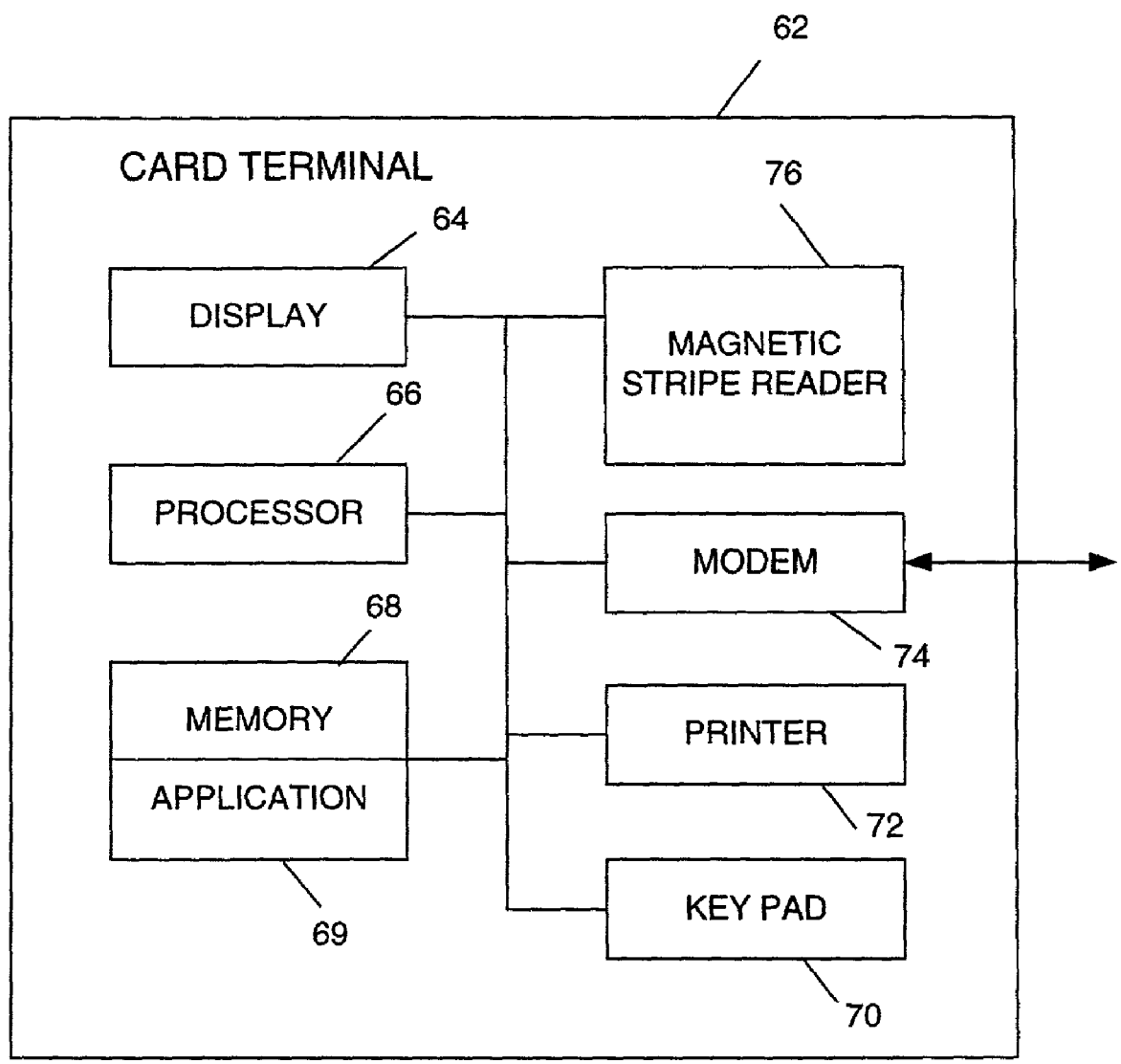
FIG. 3 is a diagram of exemplary components of a card terminal for use in the system of FIG. 2.

FIG. 3 is a diagram illustrating exemplary components of a card terminal 62, which corresponds with card terminals 58 and 60. A typical card terminal 62 includes a display 64, a processor 66, a memory 68, a key pad 70, a magnetic stripe reader 76, a modem 74, and a printer 72. Display 64 typically includes an LCD panel and can alternatively include any type of display device. Key pad 70 can be used, for example, to enter an amount to charge to a particular credit card. As an alternative to a key pad, any type of input device can be used. Magnetic stripe reader 76 is used to read the encoded information on the magnetic tape affixed to a credit card and convert it into a corresponding electrical signal for processor 66. As an alternative to a magnetic stripe reader, other devices for inputting information from a card can be used.

Printer 72 is used to print a receipt for the customer, possibly including a copy or carbon copy for the customer to sign. Alternatively, the card terminal can include a device for capturing an electronic signature by the customer using an Electronic Receipt Capture (ERC) device, which are known in the art; these devices enable the customer to sign a touch-screen, which converts the signature into an electronic image. Modem 74 is used by processor 66 for electronic communication over a telephone network via a dial-up connection, and modem 74 includes a port for connection to a telephone jack.

The memory 68 can be implemented with RAM or non-volatile memory, and it stores an application 69 for execution by processor 66 to process credit card or other transactions. Application 69 can preferably be updated, as explained below, to configure options for card terminal 62. For example, it may specify codes for authorized users of the card terminal or various options for the appearance of text on a receipt generated by printer 72.

Card terminal 62 can be implemented in any shape or configuration of a physical housing for these components. Card terminal 62 may also include different components than those shown. The term "card terminal" is intended to include any terminal for reading information from a card to process a transaction or other activity, and such cards include, for example, a credit card, debit card, smart card, or card embodying other types of financial instruments.

System Processing for Terminal Download and Transaction Monitoring

Figure 4:
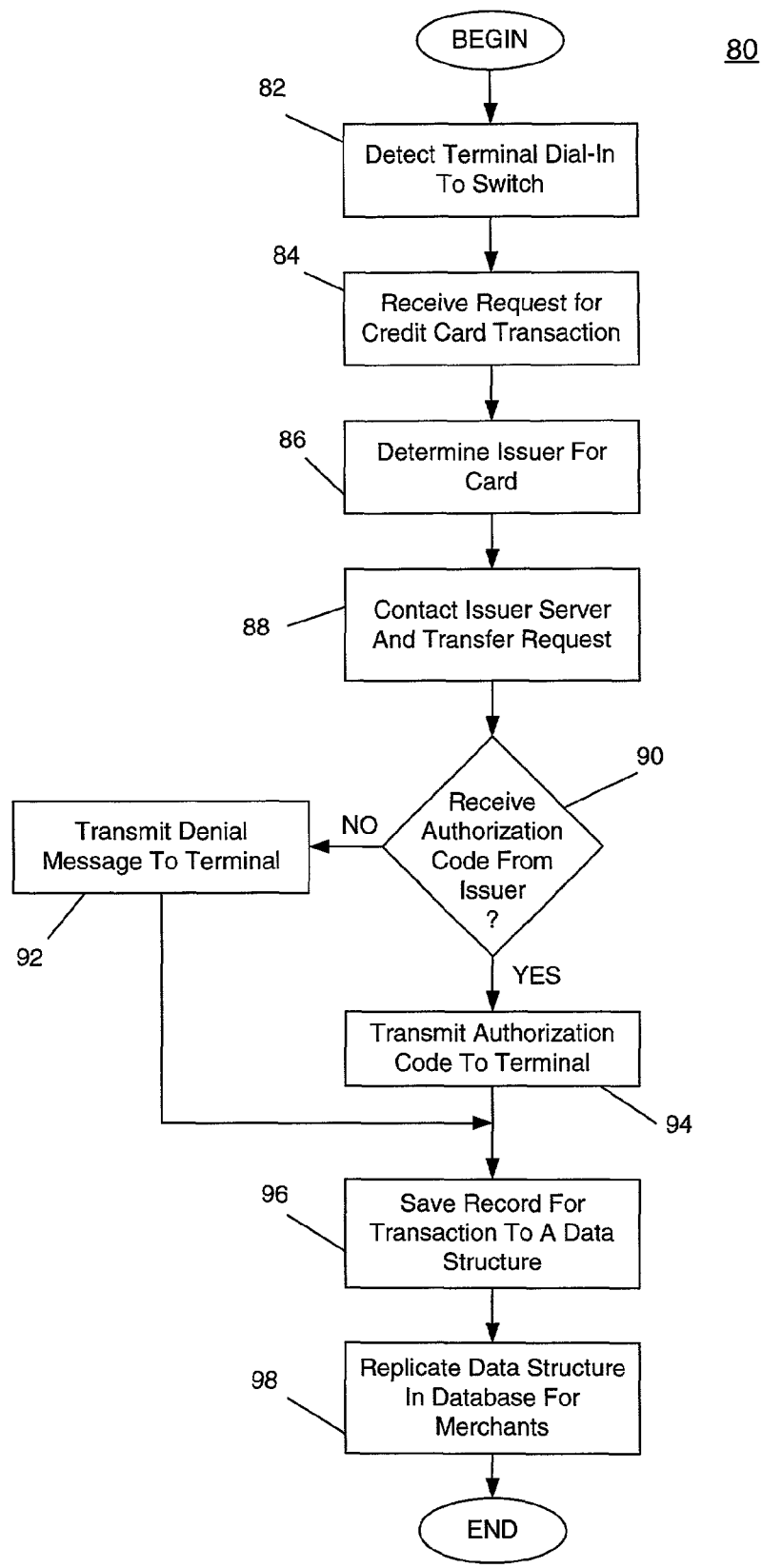
FIG. 4 is a flow chart of a method for processing card terminal transactions.

FIG. 4 is a flow chart of a method 80 for processing card terminal transactions. Method 80 can be implemented in software modules, for example, for execution by processor 52 in system server 36, possibly in conjunction with other software programs and servers. Method 80 illustrates the basic steps for processing card terminal transactions along with additional steps used for the terminal download and activity monitoring features as illustrated in FIGS. 1A and 1B. The processing of card terminal transactions and software for accomplishing the processing are known in the art.

In method 80, the system server detects a card terminal dialing in to a switch via a dial-up connection over telephone network 56 (step 82). Upon establishing a connection, the system server receives a request for a transaction from the card terminal (step 84). The request typically constitutes a credit card transaction can also include other types of transactions such as the use of debit cards or any request for an electronic payment at a card terminal. The request is typically formatted in a particular protocol depending upon the card terminal from which the system server receives it. The system server can receive an identification of the type of card terminal, along with the transaction data, in order to determine how to interpret and potentially reformat the data to process the request.

The system server determines an issuer for the card (step 86) such as Visa or American Express. The system server contacts the card issuer server, via dedicated line 59, and transfers the request (step 88), including information required to process it, such as an identification of the card holder and account, an amount of the transaction, and an identification of the merchant to receive payment. The card issuer server determines whether to approve or deny the transaction, which can involve many factors and types of processing by the issuer. For example, it can determine if the card holder has a sufficient credit limit and can perform various fraud detection routines to determine the likelihood that the transaction is fraudulent. The system server determines whether it receives an authorization code from the card issuer server (step 90). If it instead receives a denial, it transmits a denial message to the card terminal to indicate that the transaction has not been approved (step 92). If it did receive an authorization code from the issuer, it transmits the authorization code to the card terminal (step 94), which the card terminal uses to approve and complete the transaction. The system server may receive additional information from the card terminal, such as an adjusted total amount if a tip was added to a base amount for the transaction.

The system server also saves a record for the transaction to a data structure (step 96). The record can include any information required to complete the processing of the transaction and typically includes both approved and denied transactions. For example, the system server can compile all approved transactions and submit them to the corresponding issuers for batch processing, and the issuers can then arrange for a transfer of funds from the card holder's bank to the merchant bank for each transaction. Batch processing can occur, for example, once a day and include a submission of all transactions for the day in one batch communication to the card issuers. For these transactions, the system server provides the interface between the card terminals and the issuers. Other entities usually provide the actual electronic transfer of funds for the transactions.

In addition to saving the data for transactions, the system server also replicates the records in the data structure into a database for the merchants (step 98). Since the system server processes transactions, it has the data for each transaction and, by replicating the data, it can provide the data to merchants, for example, and provide other features involving the data. The system server saves and replicates the data using, for example, tables in a relational database and can alternatively use any structure, such as an object-oriented database, to save the data. Examples of various fields for the types of data saved may depend upon a type of card terminal processing a transaction, and examples of the type of data saved are provided in the screens described below. The information from the records can then be retrieved for display in, for example, web pages or other screens.

Figure 5:
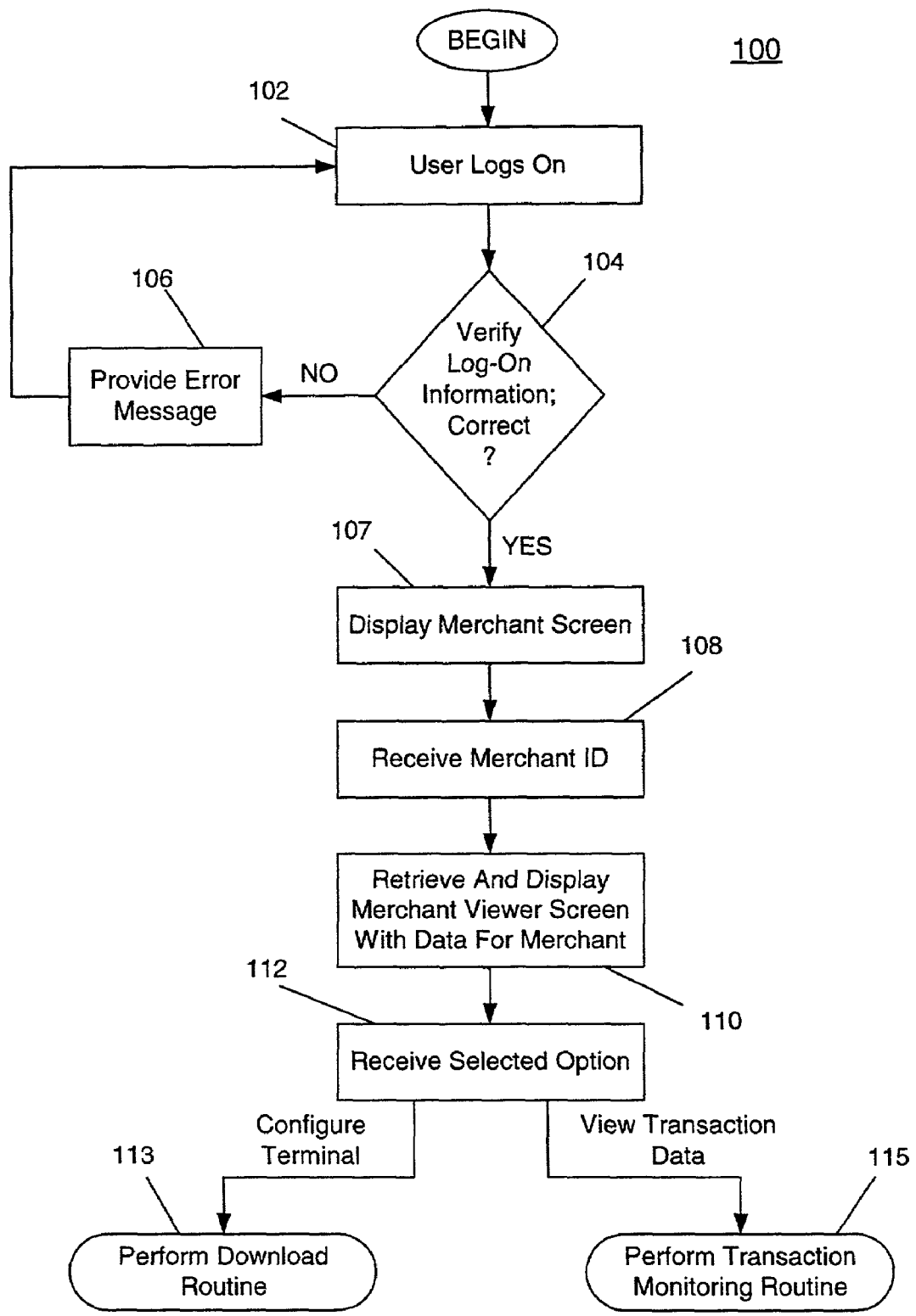
FIG. 5 is a flow chart of a merchant log in method.

FIG. 5 is a flow chart of a merchant log on method 100. Method 100 can be implemented in software modules, for example, for execution by processor 52 in system server 36. In method 100, the system server receives a user log on (step 102), which can include a user identification and password. In order to log on, a user may, for example, launch the browser and access a particular web site. The system server verifies whether the information is correct (step 104) using stored information for users or merchants. If the log on information is incorrect, the system server can provide an error message (step 106). Otherwise, if the log on information is correct, the system server displays a merchant screen corresponding with a merchant for the logged on user (step 107).

Figure 9:
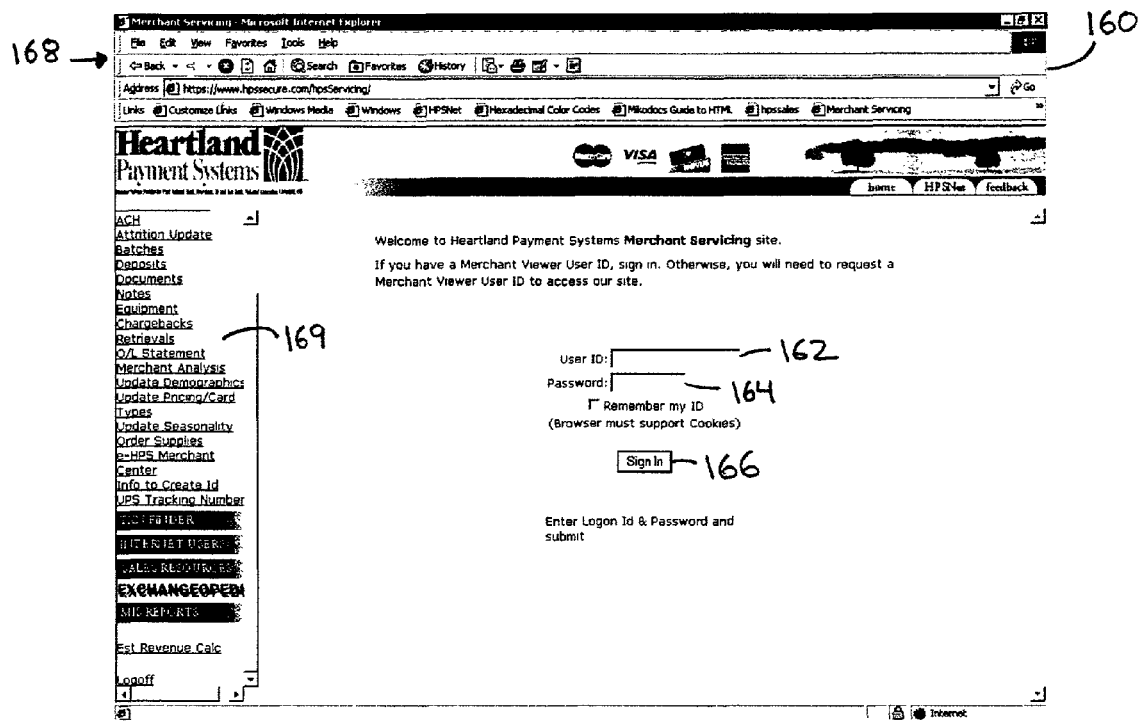
FIG. 9 is a diagram of a log in screen.

FIG. 9 is a diagram of a log in screen 160. The user can enter a user identification in section 162 and a password in section 164, and then select a section 166 to submit the information to the system server. The log on is used in this method for merchants having an account with the system server. For new merchants, the system server can query the merchant to obtain information used to create an account, including identification of authorized users for the merchant and their passwords. As illustrated in screen 160, the various screens presented to users can include a toolbar 168 having conventional browser functions and include a section 169 for the user to select various features.

Figure 10:
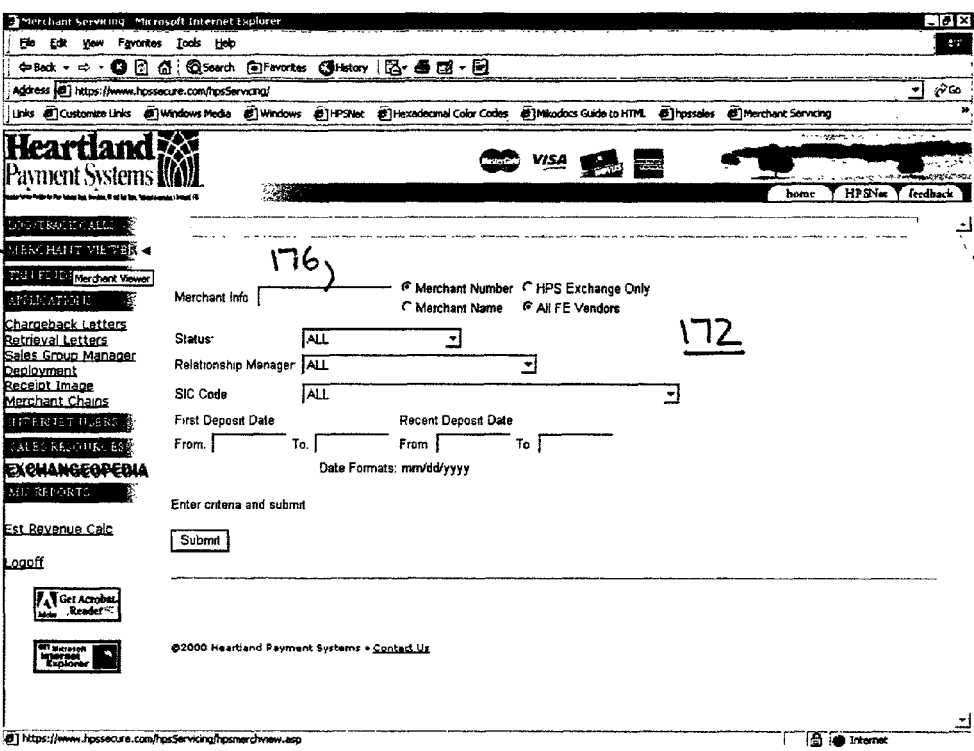
FIG. 10 is a diagram of a merchant screen.
Figure 11:
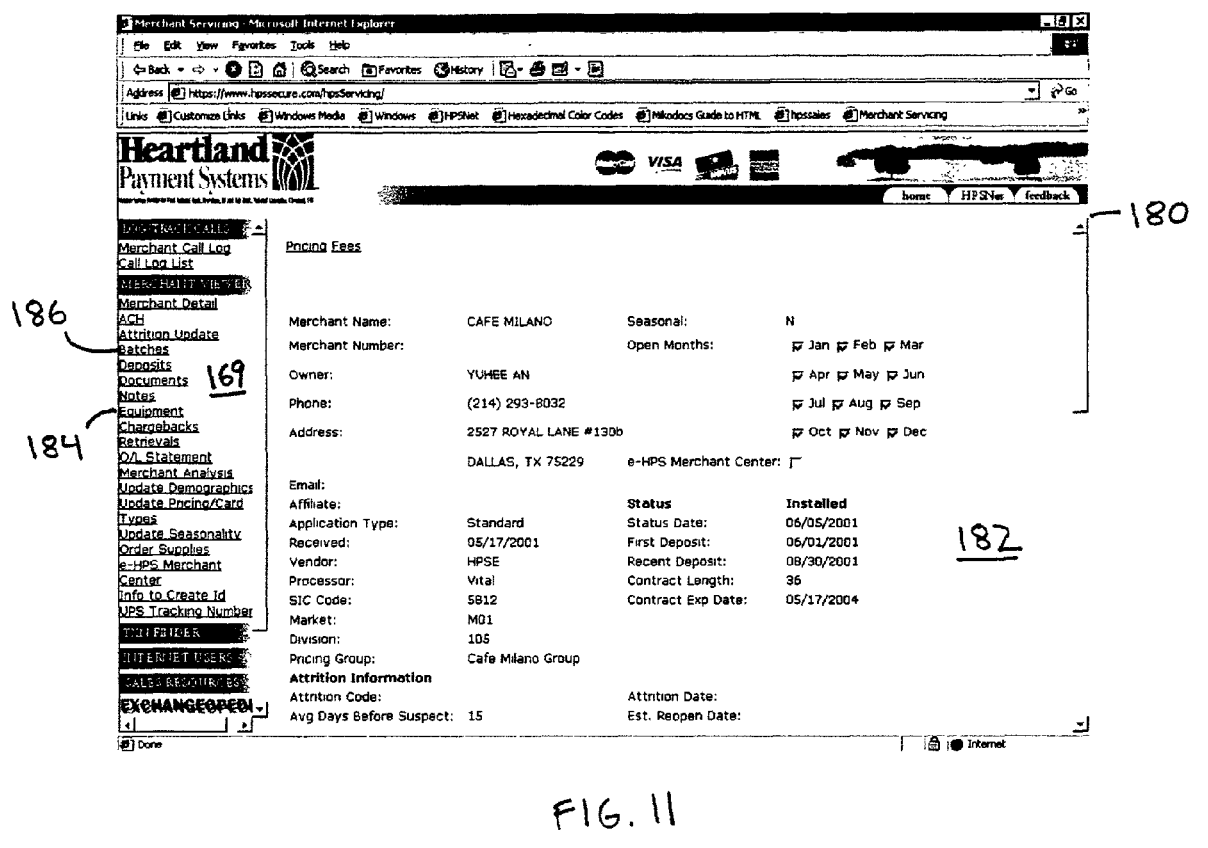

FIG. 10 is a diagram of a merchant screen 170 for display by step 107. Screen 170 can include a section 172 for displaying information for the merchant. The system server can receive a merchant identifier (step 108), as entered by the user in section 176, and selection of a merchant viewer section 174, used to access the terminal download and activity monitoring features. These features can be selected or accessed in other ways, and the sequence of screens shown and further described below is provided for illustrative purposes only. In response, the system server displays a merchant viewer screen with information for the merchant identified by the user in section 176 (step 110). FIG. 11 is a diagram of a merchant viewer screen 180, which includes a section 182 illustrating display of information describing the merchant and status information for it.

On the merchant viewer screen 180, the user can select the equipment (terminal download) or batches (activity monitoring) feature. In particular, the user can select a section 184 to access the terminal download feature and select a section 186 to access the activity monitoring feature. The terms equipment and batches for these features are intended only as labels. The system server receives a selected option (step 112). If the user selected section 184, the system server executes a method for the download feature (step 113). If the user selected section 186, the system server executes a method for the activity monitoring feature (step 115).

Figure 6:
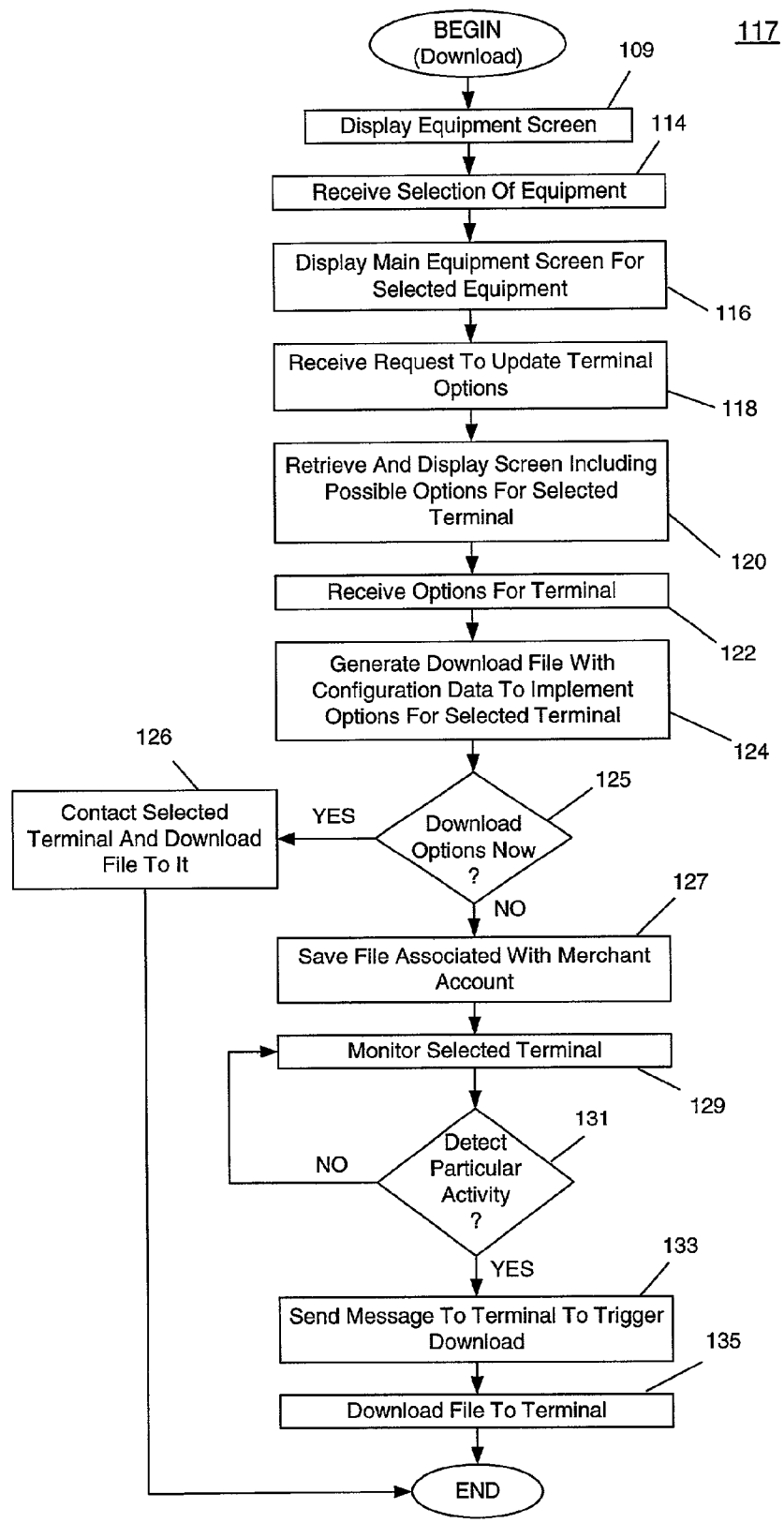
FIG. 6 is a flow chart of a method for downloading configuration data or an application to a card terminal.
Figure 12:
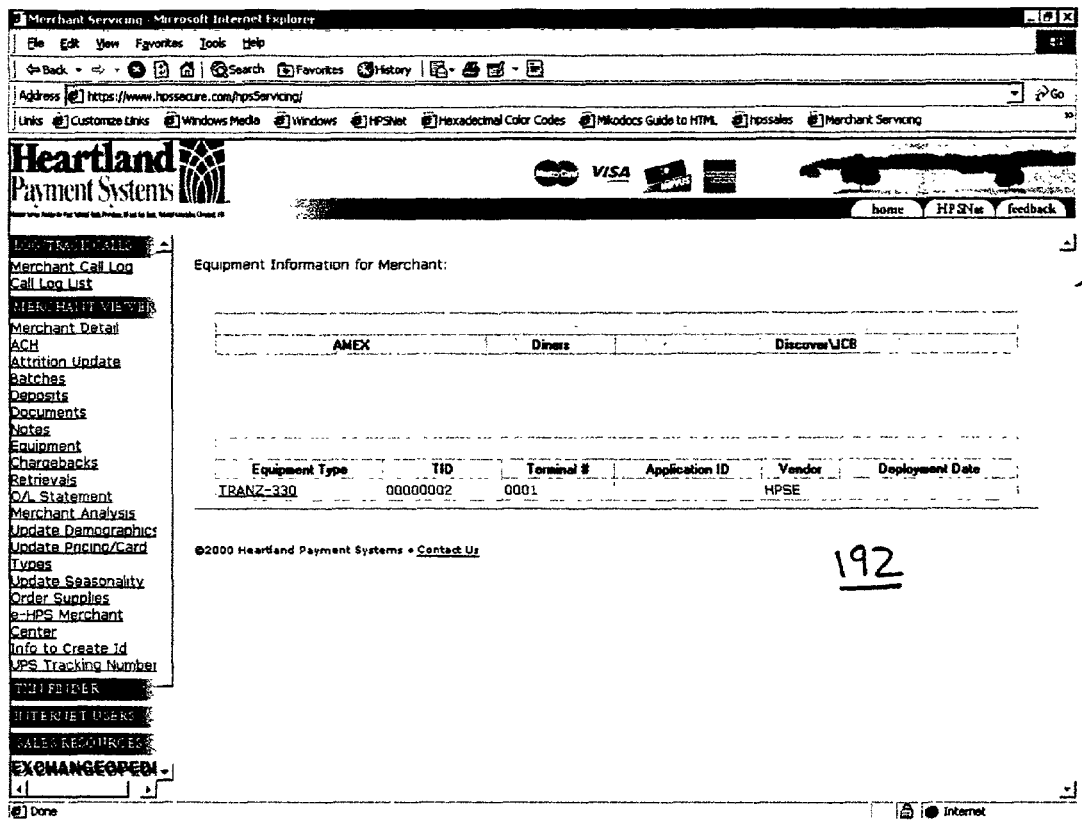
FIG. 12 is a diagram of a merchant equipment screen.

FIG. 6 is a flow chart of a method 117 for downloading an application or information to a card terminal to implement the download feature of step 113. Method 117 can be implemented in software modules, for example, for execution by processor 52 in system server 36. Upon the user selecting section 184, the system server displays an equipment screen (step 109). FIG. 12 is a diagram of a merchant equipment screen 190, which includes a section 192 for displaying an indication, as shown in this example, for the merchant's equipment. The various card terminals operated by the merchant are a type of equipment, as identified in section 192, and each type or brand of card terminal can be categorized as a different type of equipment.

Figure 13:
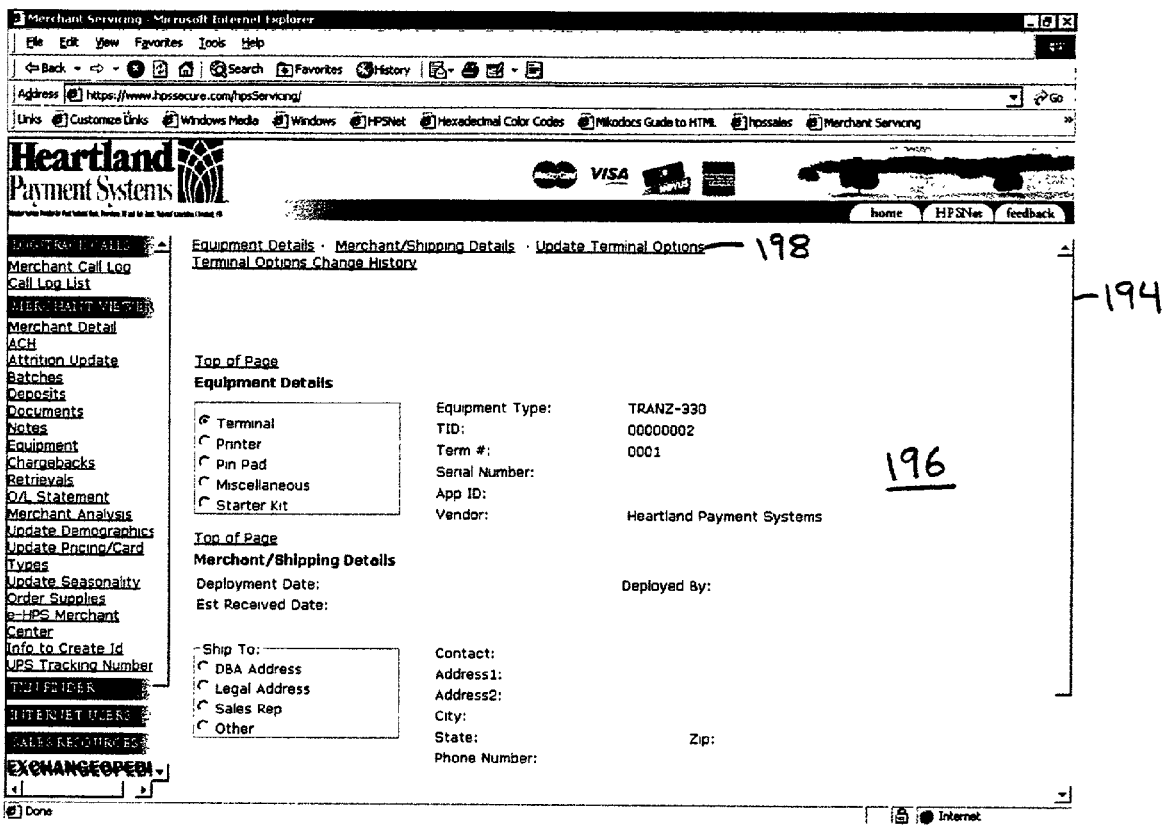
FIG. 13 is a diagram of a main equipment screen.

The system server receives selection of a type of equipment from section 192 (step 114). For example, a user may select or "click on" the displayed identification of equipment in section 192. In response to the selected equipment, the system-server displays a main equipment screen for the selected equipment (step 116). FIG. 13 is a diagram of a main equipment screen 194, which includes a section 196 displaying information identifying the selected equipment. The system server can then receive, via a user's selection of a section 198, a request to update options for the card terminal (step 118). In response, the system server retrieves and displays a screen including possible options for the selected card terminal (step 120).

Figure 14:
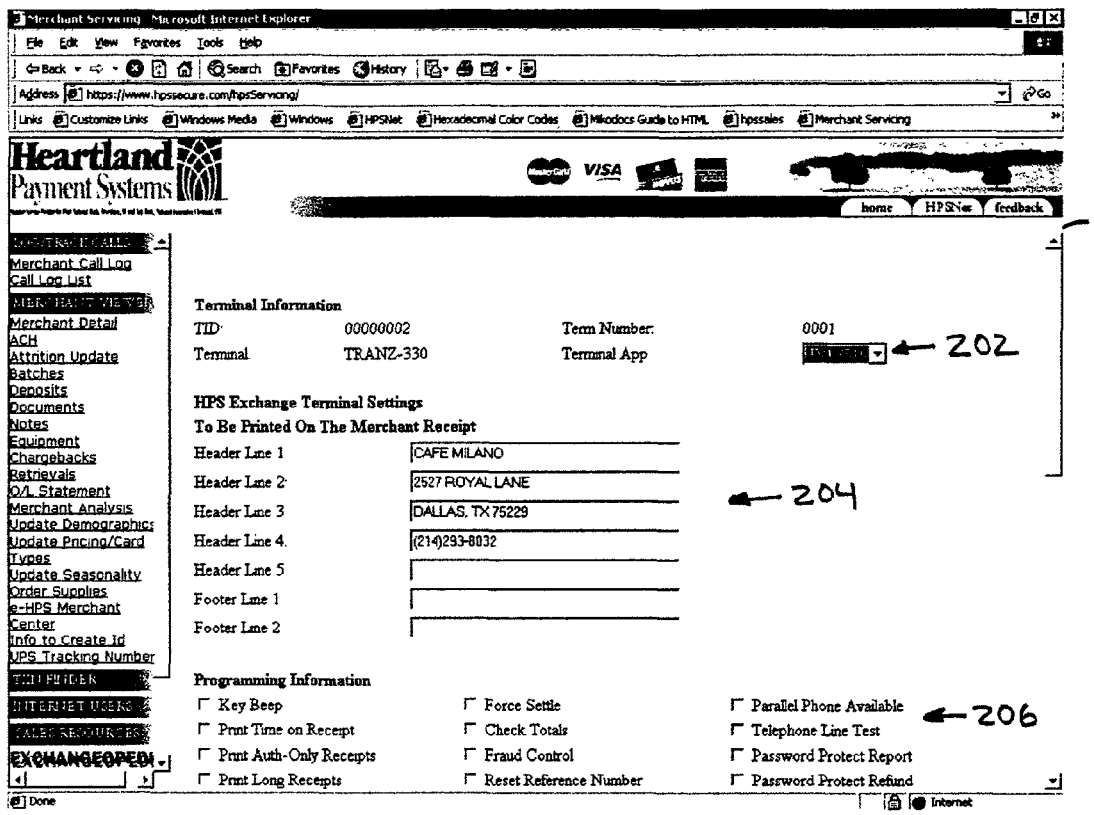
FIGS. 14 and 15 are a diagram of a terminal options screen for a first type of exemplary card terminal.
Figure 15:
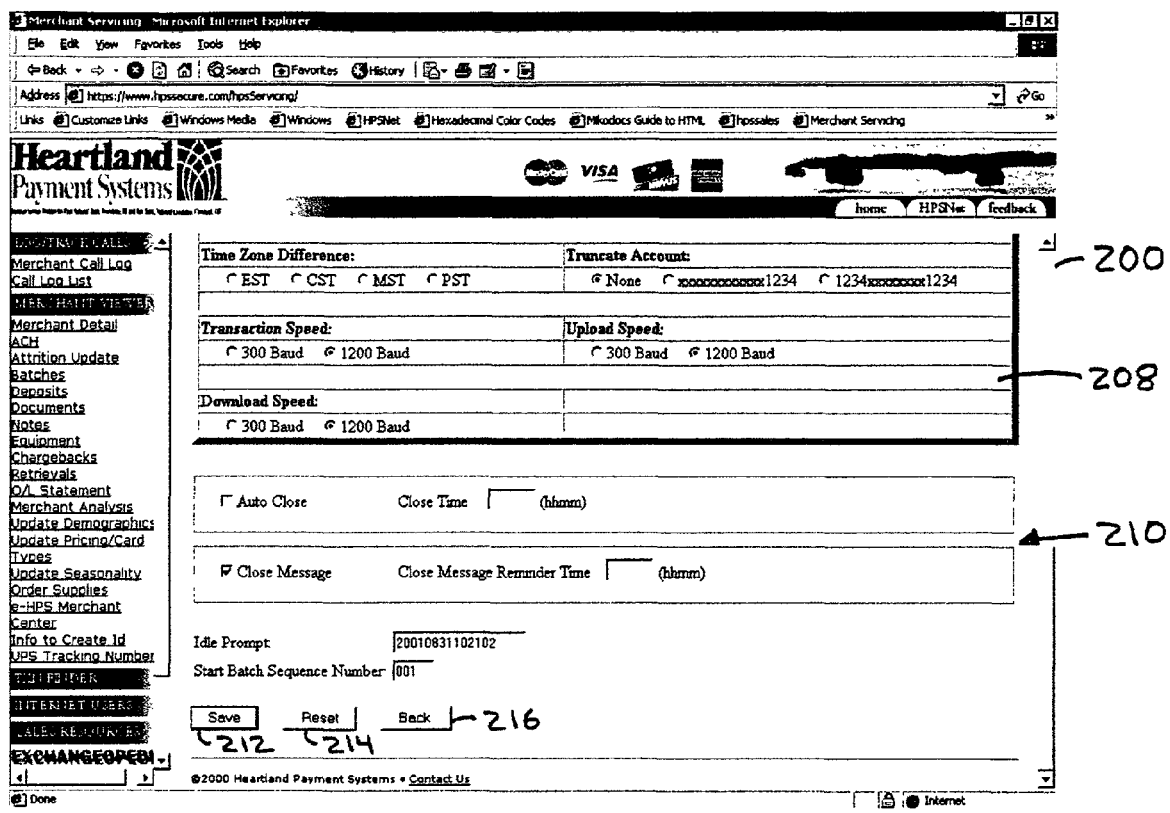

FIGS. 14 and 15 are a diagram of a terminal options screen 200 for a first type of exemplary card terminal, the Tranz 330 and Tranz 380 machines. A user would scroll the screen 200 to view all displayed options. Screen 200 includes a section 202 identifying the card terminal and various sections, in this example, for a user to specify options. A section 204 allows the user to enter information to be printed on a receipt by the card terminal, such as the merchant's name, address, and phone number. A section 206 allows he user to select programming options by selecting or "clicking on" the displayed box next to each option in order to select or deselect it. A section 208 allows the user to select options for communications with the card terminal. A section 210 allows the user to select batch closing options. The user can select a save section 212 to save the entered options, select a reset section 214 to revert to the previous options for the card terminal, and select a back section 216 to page back to the previous screen.

Figure 16:
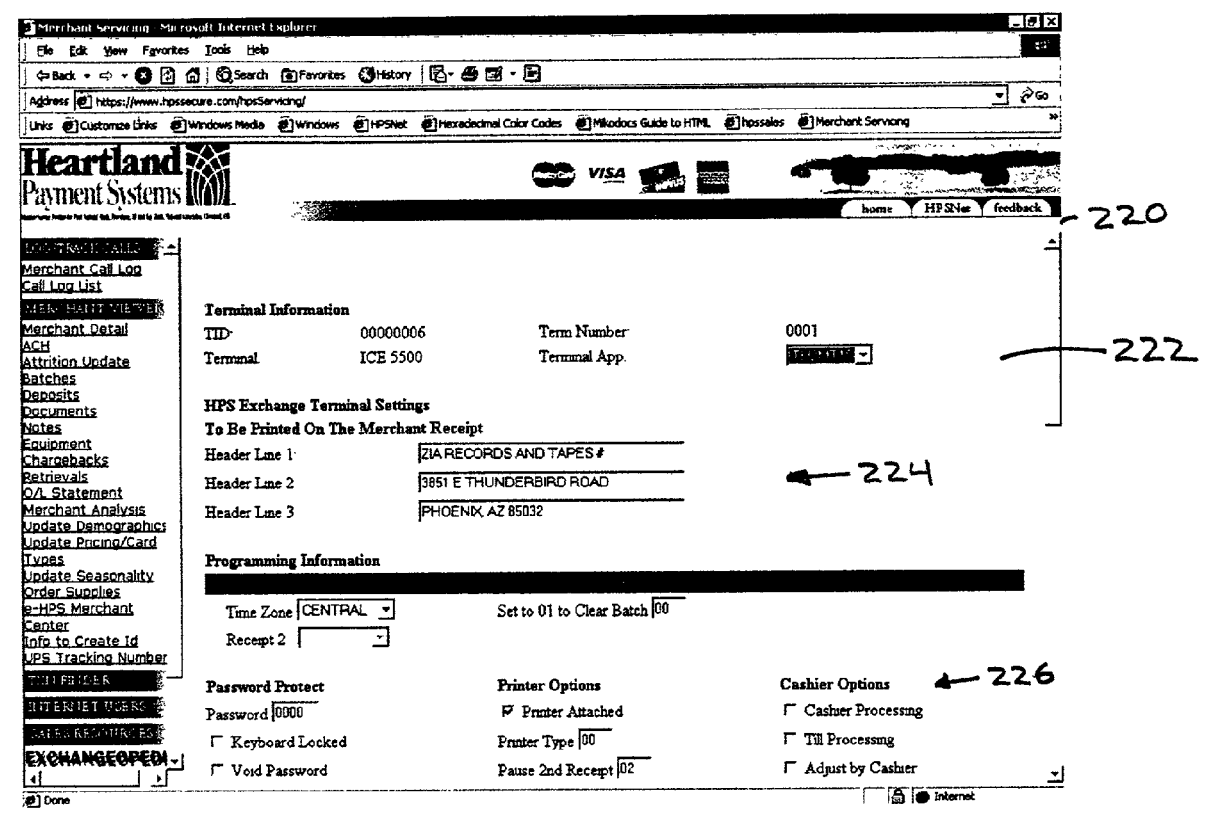
Figure 17:
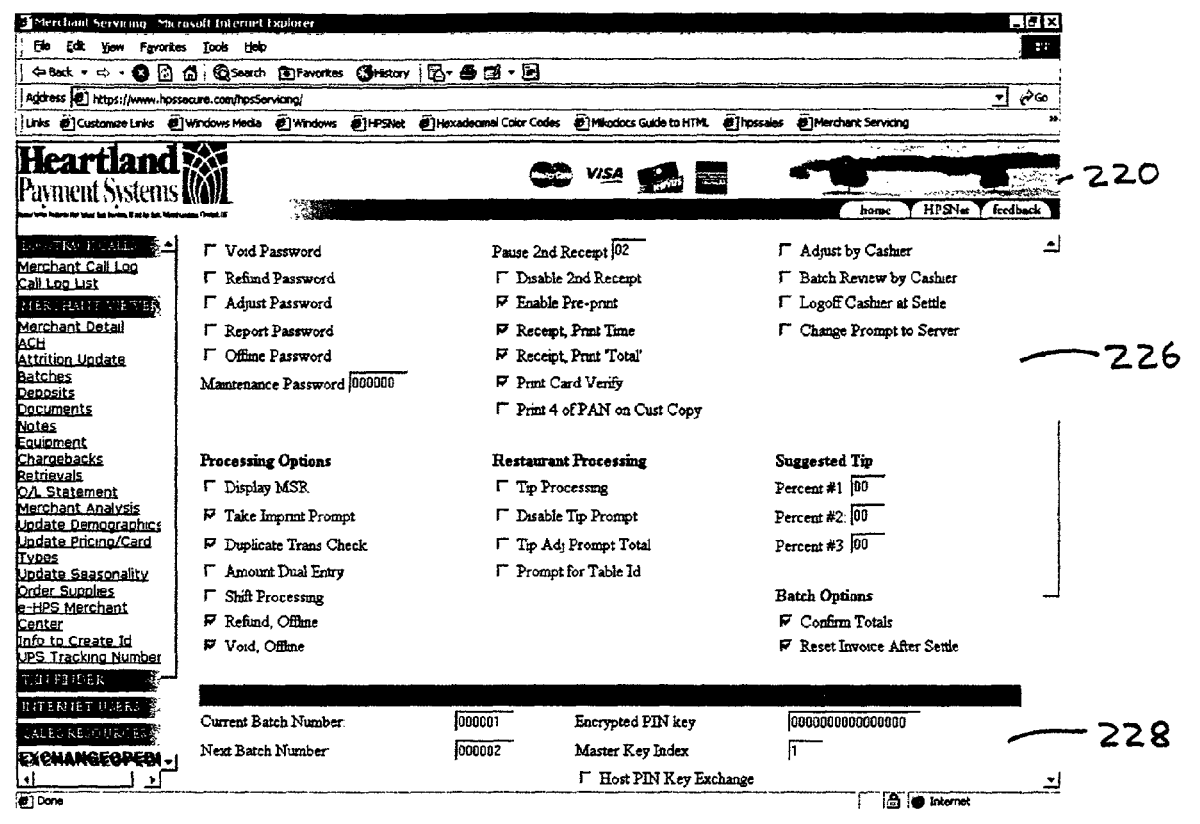
Figure 18:
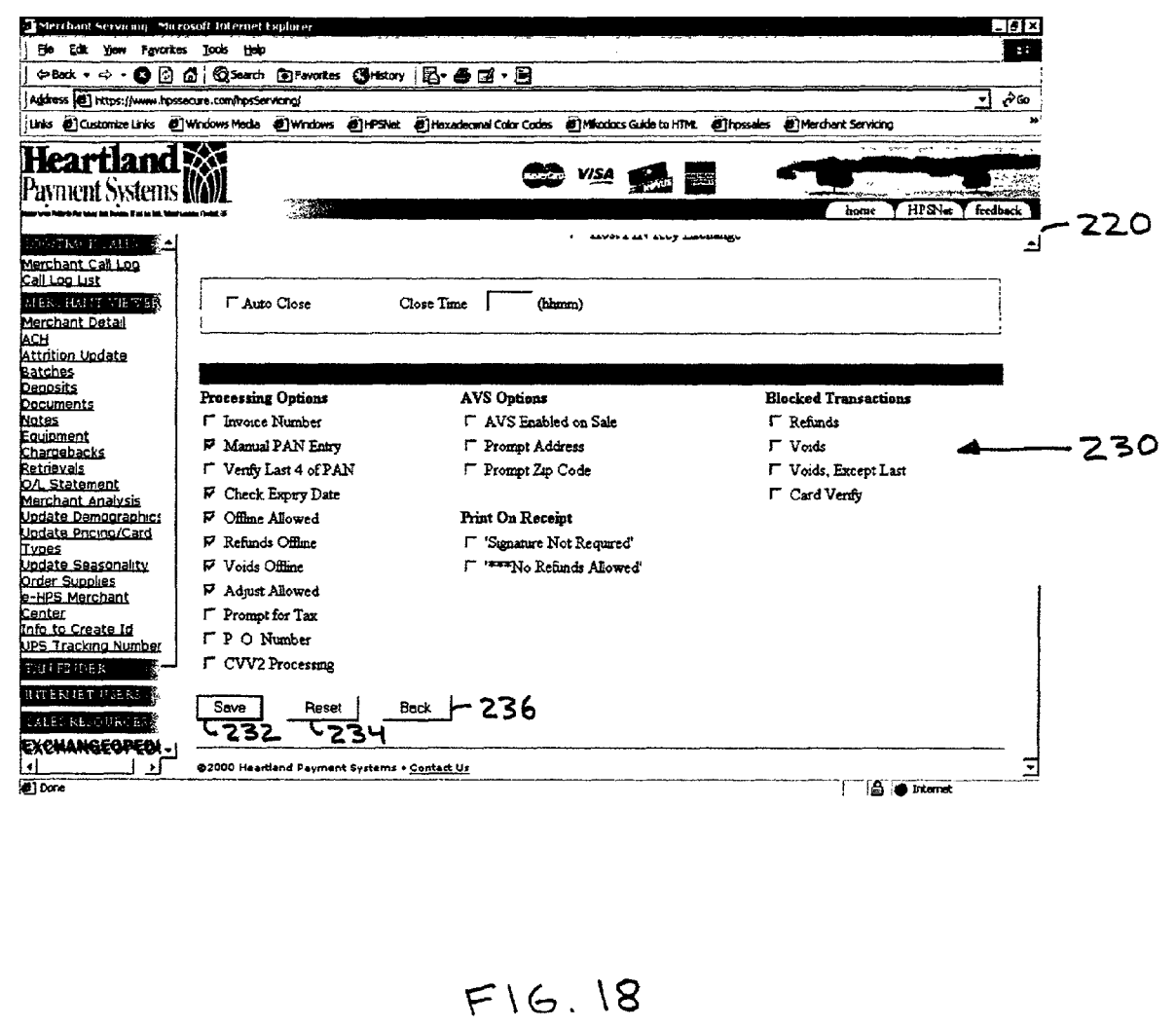

FIGS. 16, 17, and 18 are a diagram of a terminal options screen 220 for a second type of exemplary card terminal, the Hypercom T7 and ICE 5500 machines. As with screen 200, a user would scroll the screen 220 to view all displayed options. Screen 220 includes a section 222 identifying the card terminal and various sections, in this example, for a user to specify options. A section 224 allows the user to enter information to be printed on a receipt by the card terminal, such as the merchant's name, address, and phone number. A section 226 allows the user to select programming options by selecting or "clicking on" the displayed box next to each option in order to select or deselect it. A section 228 allows the user to select batch closing options. A section 230 allows the user to select processing options by selecting or "clicking on" the displayed box next to each option in order to select or deselect it. The user can select a save section 232 to save the entered options, select a reset section 234 to revert to the previous options for the card terminal, and select a back section 236 to page back to the previous screen.

The screens in FIGS. 14-18 for the identified types of card terminals are provided as examples only. The types of options depend upon a particular card terminal, and the configuration can be preformed for any type of card terminal in addition the examples provided.

Upon the user selecting save section 212 or 232, the system server receives options for the selected card terminal (step 122). The options are typically sent as a web page from screen 200 or 220, for example, via network 40 such as the Internet or other network. The system server generates a download file with configuration data to implement the received options for the selected terminal (step 124). The term "configuration data" includes any type of information, possibly including commands, for configuring options for a card terminal or performing programming of a card terminal. The generation of the download file may include translating the information from the web page or other entered format into a format required by the protocol and programming rules for communicating with the intended card terminal. Each type of card terminal may use its own particular rules or algorithms to program it, and the system server, knowing the type of intended card terminal, can be programmed to perform the various translations to convert the web page information entered by the user into an appropriate data stream for that card terminal. The download file may be implemented with an application image, which refers to the type of data stream to be transmitted to a card terminal for programming it.

Table 1 illustrates the generation of a data stream to program options for a card terminal. In the example illustrated in Table 1, a Structured Query Language (SQL) database stores data for merchant database fields (left column) such as an American Express number. That data populates a Vericenter database with the data in the right column, which in turn populates the corresponding memory locations in the card terminal as indicated by the middle column. When tables are used, they can be loaded in the appropriate format depending upon the options being set and the type of card terminal. The information from the various fields can thus be combined in a data stream to populate the corresponding memory locations of a card terminal in order to program options for it. The format of the data stream will depend upon the programming requirements of particular card terminals. Aside from a data stream, other types of network communications can be used to program a card terminal.

TABLE 1

| Merchant Database Field | Vericenter Memory Location | Vericenter Field to be Updated |
|---|---|---|
| Merchants.AmexNbr | 0042 | Populate field with "340000000000.349999999999.1*AX*11*N" |
|  | 0043 | Populate field with "370000000000.379999999999.1*AX*11*N" |
| Merchants.DiscJCBNbr | 0044 | Populate field with "601100000000.601199999999.1*DS*11*N" |
|  | 0045 | Populate field with "352800000000.358999999999.1*JC*11*N" |
| Merchants.DinersNbr | 0046 | Populate field with |

TABLE 1-continued

| Merchant Database Field | Vericenter Memory Location | Vericenter Field to be Updated |
|---|---|---|
| | 0047 | Populate field with "300000000000.305999999999.1*DC*11*N" |
| | 0048 | Populate field with "360000000000.369999999999.1*DC*11*N" |
| | 0049 | Populate field with "380000000000.388999999999.1*DC*11*N" "389000000000.389999999999.1*DC*11*N" |

The system server determines whether to download the file with configuration data now or wait for detection of particular activity at the card terminal (step 125). For example, it may wait until a request for a transaction or a closing of a batch at the card terminal to reconfigure it with new options, or it may by default automatically contact the card terminal, if accessible, and download the file with the configuration data for the new options. The "activity" can include any processing or other activity at a card terminal. If reconfiguring the card terminal without waiting for particular activity from it, the system server contacts the selected card terminal using, for example, a dial-up connection via telephone network 56 and downloads the file to it as a data stream (step 126). The card terminal, under its own processing via processor 66, can reconfigure itself using the options specified in the download file.

Figure 7:
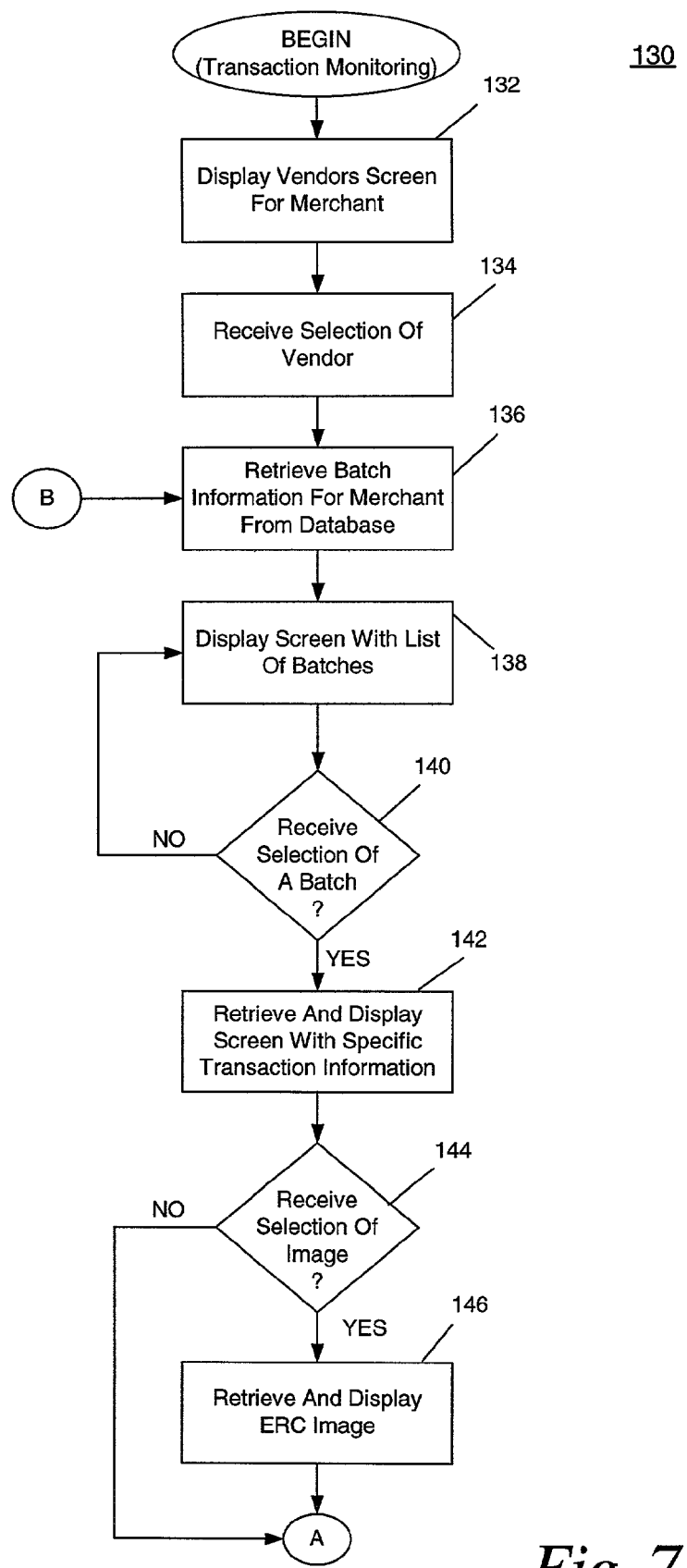
FIGS. 7 and 8 are a flow chart of a method for providing information concerning activity at card terminals.
Figure 8:
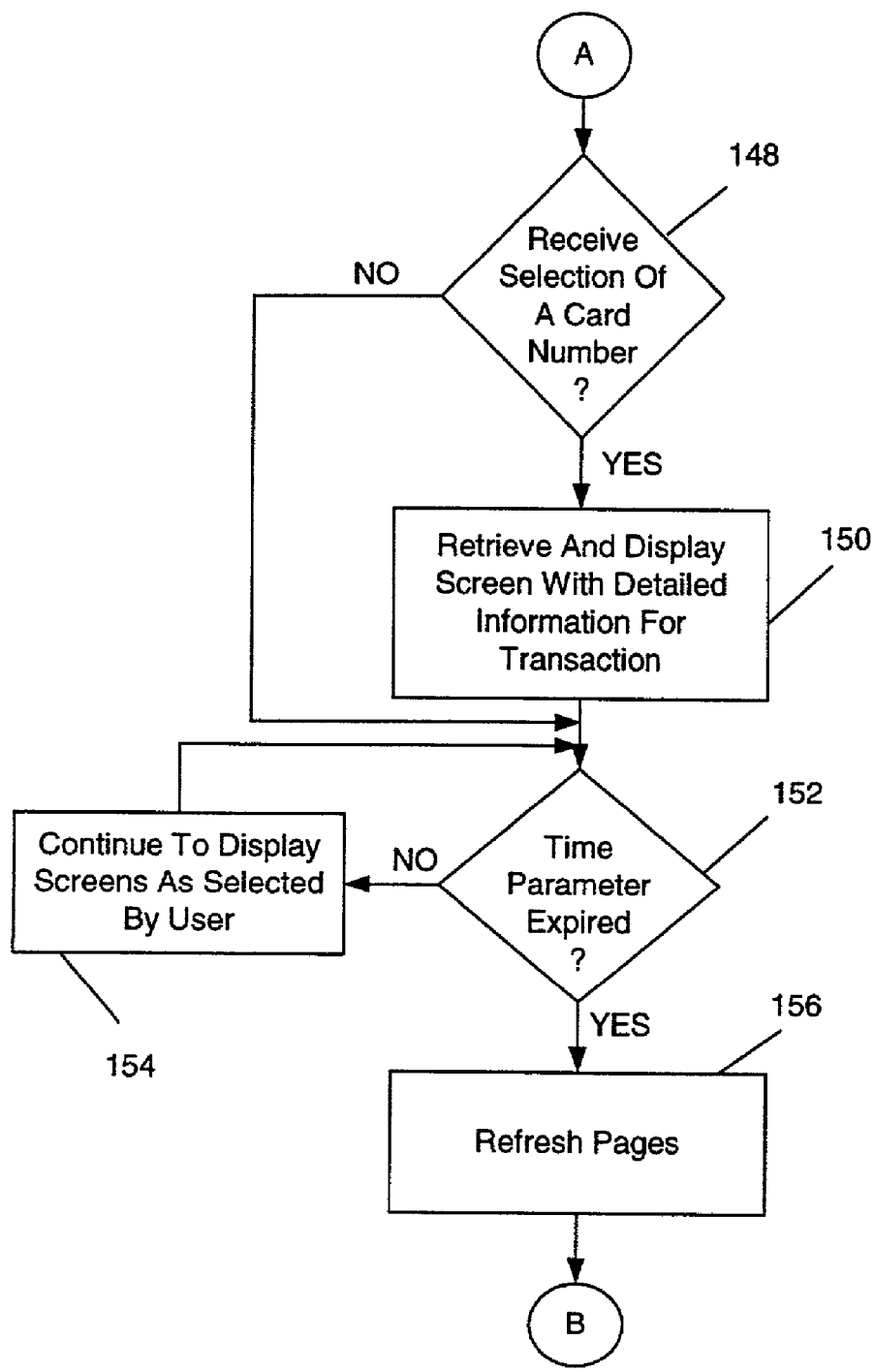
Figure 19:
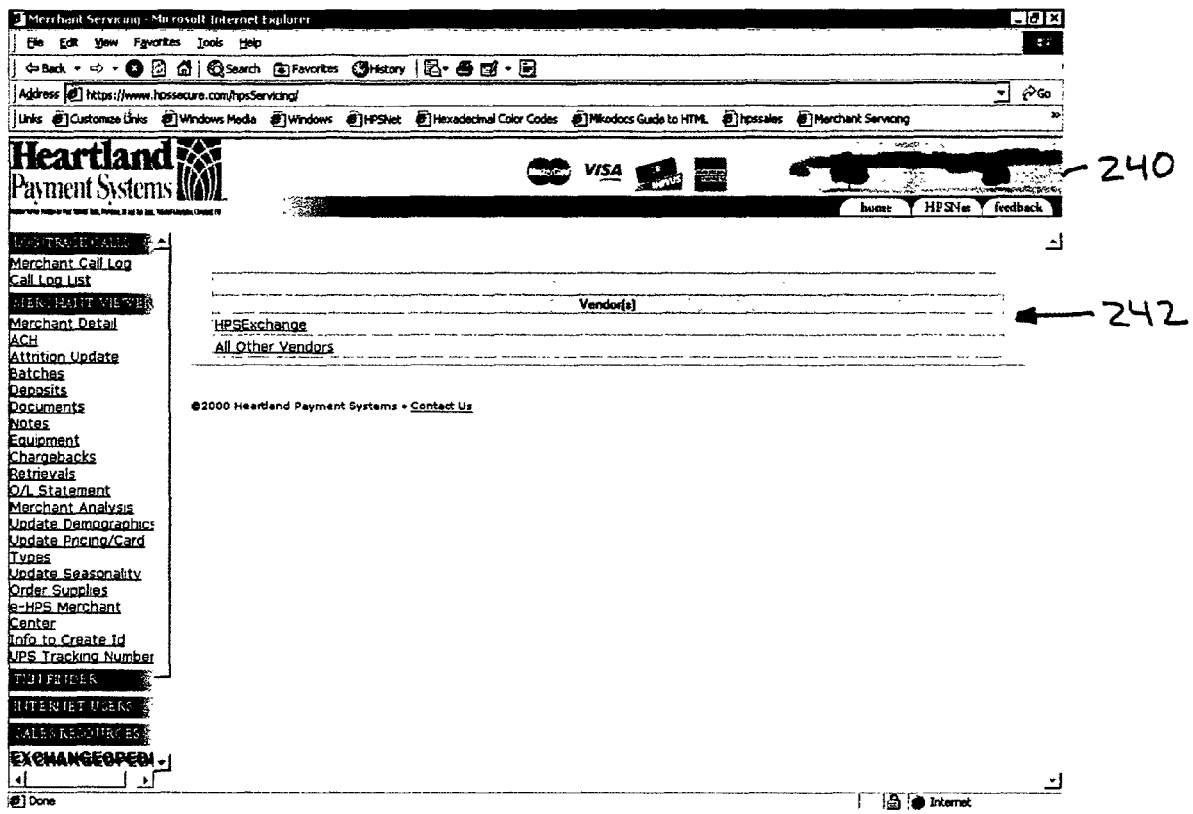
FIG. 19 is a diagram of a vendor screen.

If the card terminal is to be reconfigured based upon activity at it, the system server saves the download file associated with the merchant account (step 127). The system server monitors the merchant account to detect activity from the particular card terminal (step 129), which may be performed as part of or in conjunction with method 80. For example, it may wait until a request from the card terminal to close a batch or process a transaction. Upon detecting the particular activity (step 131), the system server transmits a message via the dial-up connection with the card terminal to download an application (step 133), in this case a file with options to reprogram the card terminal. The message can be displayed on display 64 at the card terminal. The system server downloads the file with the information for the new options to the card terminal upon receiving the signal from the card terminal to initiate the download (step 135). The downloading in this example typically occurs after processing of the original request from the card terminal FIGS. 7 and 8 are a flow chart of a method 130 for providing information concerning activity at card terminals. Method 130 can be implemented in software modules, for example, for execution by processor 52 in system server 36. Upon the user selecting section 186 in the merchant viewer screen 180, the system server displays a vendor screen (step 132). FIG. 19 is a diagram of a vendor screen 240, which includes a section 242 to identify vendors when the merchant uses multiple vendors for processing transactions. The system server receives the user's selection of a vendor in section 242 (step 134). It retrieves batch information for the merchant from the database (step 136). Since the system server replicates the records for each transaction, as shown in step 98 in method 80, it can retrieve records of batches for this merchant, as well as other transaction data described below. It has the identity of the merchant from the user's log on process and can match that information with records for the merchant in the database. Also, since the replication of the records can be accomplished with a short processing time, the activity data can be made quickly available to logged on users.

The system server displays a screen compiling a list of batches for the merchant and selected card terminal(s) (step 138). FIG. 20 is a diagram of a batches screen 244, providing a list of batches in a section 246. As shown by the columns in section 246, screen 244 provides a summary in this example for each particular batch. Batch information can include any information or sub-set of information relating to a group of transactions. In screen 244, a user can select a displayed batch, such as by "clicking on" the corresponding line, in order to view more information for the selected batch.

Figure 21:
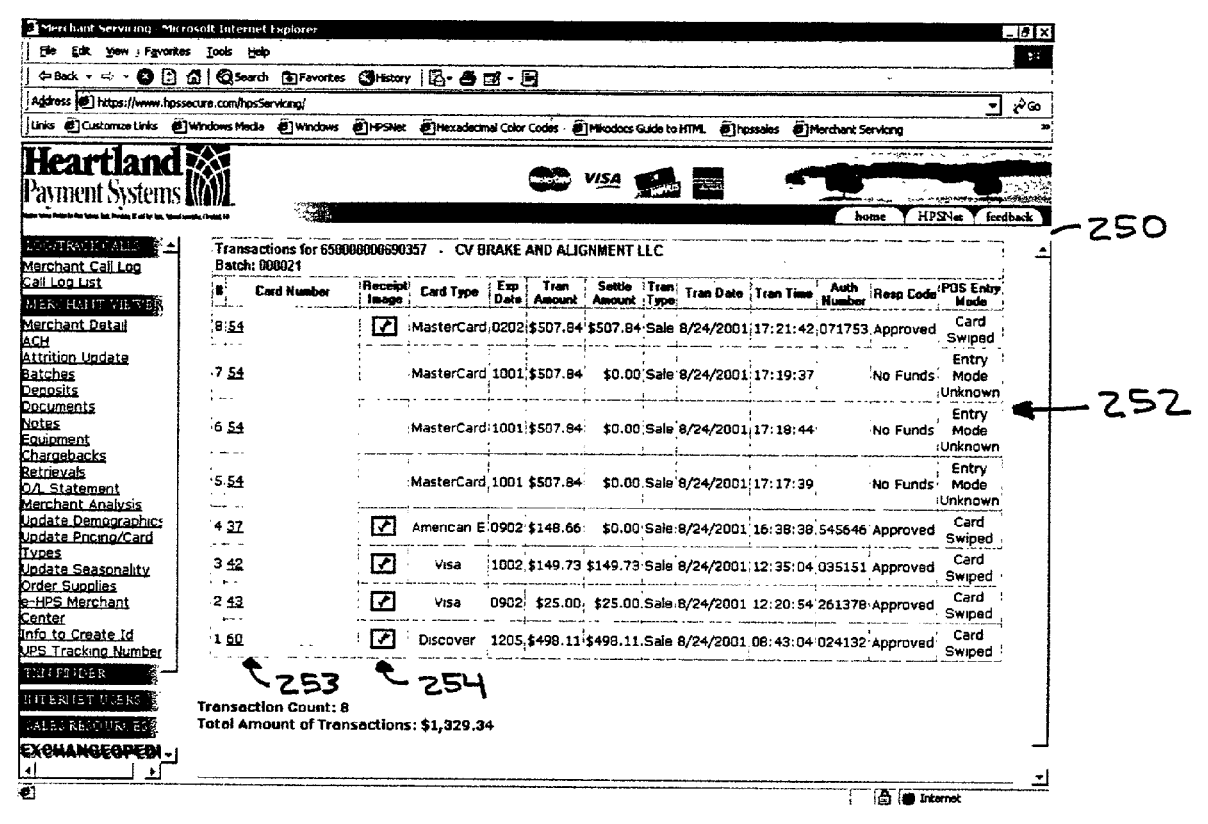
Figure 22:
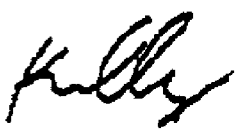
FIG. 22 is a diagram of a screen showing an exemplary receipt image.

The system server determines whether it receives selection of a batch (step 140). If it receives such a selection, it retrieves and displays a screen with specific transaction information for the selected batch (step 142). FIG. 21 is a diagram of a transaction information screen 250, illustrating in a section 252 information concerning the particular transactions for the selected batch. Section 252 illustrates an example of the type of information that can be provided as shown by the information in the columns. Section 252 in this example also includes a column 254 to indicate if the card terminal that processed the corresponding transaction has ERC capability. A check mark in column 254 indicates, in this example, that the transaction on the same line as the check mark occurred at an ERC-capable card terminal. The user can select or "click on" the check mark to view an image of the receipt. The system server determines if it receives the user's selection of an image in column 254 (step 144); if so, it retrieves and displays an image for the selected transaction (step 146). As part of replicating the data for each transaction, as described above, the system server can capture and store an electronic image of the receipt from card terminals with ERC capability. FIG. 22 is a diagram of a screen 260 showing an exemplary receipt image 262, which can be displayed overlaid on screen 250, for example.

Figure 23:
FIG. 23 is a diagram of a transaction detail screen.

The system server also determines whether it receives selection of a card number in column 253 for the displayed transactions (step 148). If it receives selection of a transaction in section 252, it retrieves and displays a screen providing detailed information for the selected transaction (step 150). FIG. 23 is a diagram of a transaction detail screen 264, providing general information in a section 266 for the selected transaction and a section 268 providing specific details of the transaction.

The system server can continually retrieve and display batch and transaction information for the merchant as long as the user remains logged on to the system server site. It can perform this process based upon a time parameter, or as it detects new batch information for the merchant. The time parameter can specify, for example, how long to wait before obtaining information again from the database or particular times to obtain the data. The time parameter can also include a time value of zero meaning to continuously scan the database for information without waiting for a time-out or a particular time.

In this example, it determines if a time parameter is satisfied (step 152); if not, it continues to retrieve information and display screens as selected by the user and described above (step 154). If the time parameter is satisfied, the system server refreshes the pages with new information (step 156) by returning to step 136 to retrieve batch information for the merchant. Any new information for batches will have been replicated and stored, thus making them available when the system server retrieves data to refresh the displayed screens.

The information stored in replicated records for display in screens 244, 250, 260, and 264 can be maintained, for example, in tables having fields corresponding with the information in the screens. Alternatively, any type of data structure can be used.

While the present invention has been described in connection with an exemplary embodiment, it will be understood that many modifications will be readily apparent to those skilled in the art, and this application is intended to cover any adaptations or variations thereof. For example, various types of user machines, card terminals, system servers, and screens or web pages may be used without departing from the scope of the invention. This invention should be limited only by the claims and equivalents thereof.

What is claimed is:

1. A method for downloading an application to a card terminal from a remote network connection, comprising:
   receiving from the remote network connection a request to download an application to the card terminal using a processing arrangement;
   monitoring the card terminal using the processing arrangement to detect at least one activity of a financial transaction performed at the card terminal;
   detecting the at least one activity performed at the card terminal; and
   based on the detection procedure, electronically transmitting to the card terminal information related to the request for use in downloading the application to the card terminal.

2. The method of claim 1 wherein the receiving step includes receiving the request via a web page.

3. The method of claim 1 further comprising the step of generating a data stream for transmission to the card terminal.

4. The method of claim 1 wherein the transmitting step includes transmitting the information upon detecting a command corresponding to closing of a batch of data associated with a plurality of financial transactions at the card terminal.

5. The method of claim 1, further comprising downloading the application to the card terminal.

6. The method of claim 1 further comprising translating the request into a format corresponding to the card terminal.

7. The method of claim 1 wherein the at least one activity is at least one of a request to process a financial transaction or a closing of a batch of data associated with a plurality of financial transactions.

8. The method of claim 1, wherein the processing arrangement further comprises a storage arrangement containing information associated with configuration of the card terminal.

9. The method of claim 1, wherein the monitoring step is performed based on the receiving step.

10. The method of claim 1, wherein the at least one activity comprises at least one of a use of a debit card, a use of a credit card, a request for electronic payment, or closing of a batch of data associated with a plurality of financial transactions.

11. A method for providing configuration data to a card terminal via a remote network connection, comprising:
    receiving information from the remote network connection relating to configuring the card terminal using a processing arrangement;
    generating configuration data from the information which at least one of enables or performs reconfiguration of the card terminal according to the received information;
    monitoring the card terminal using the processing arrangement;
    detecting at least one activity of a financial transaction performed at the card terminal; and
    based on the detection procedure, electronically transmitting the configuration data to the card terminal in order to reconfigure the card terminal according to the configuration data.

12. The method of claim 11 wherein the receiving step includes receiving the information via a web page.

13. The method of claim 11 wherein the generating step includes generating a data stream for transmission to the card terminal.

14. The method of claim 11 wherein the information comprises at least one of (i) an indication of information to be printed on a receipt at the card terminal; (ii) an indication of audio information to be generated by the card terminal; or (iii) an indication of visual information to be displayed on the card terminal.

15. The method of claim 11 wherein the receiving step includes receiving the information from a network connection remote from the card terminal.

16. The method of claim 11 wherein the transmitting step includes transmitting a message to the card terminal relating to triggering of downloading of the configuration data.

17. The method of claim 11 wherein the at least one activity is at least one of a request to process the financial transaction or a closing of a batch of data associated with a plurality of financial transactions.

18. The method of claim 11, wherein the processing arrangement further comprises a storage arrangement containing information associated with configuration of the card terminal.

19. The method of claim 11, wherein the monitoring step is performed based on the receiving step.

20. The method of claim 11, wherein the at least one activity comprises at least one of a use of a debit card, a use of a credit card, a request for electronic payment, or closing of a batch of data associated with a plurality of financial transactions.

21. An apparatus for downloading of an application to a card terminal via a network, comprising a processing arrangement configured to:
    receive via a remote network connection a request to download an application to the card terminal;
    monitor the card terminal to detect at least one activity of a financial transaction performed at the card terminal;
    detect the at least one activity; and
    transmit information related to the request for use in downloading the application to the card terminal upon detecting the at least one activity performed at the card terminal.

22. The apparatus of claim 21, further comprising a module configured to receive the request via a web page.

23. The apparatus of claim 21, further comprising a module configured to generate a data stream for transmission to the card terminal.

24. The apparatus of claim 21, further comprising a module configured to transmit the message upon detecting a command corresponding to closing of a batch of data associated with a plurality of financial transactions at the card terminal.

25. The apparatus of claim 21, wherein the processing arrangement is further configured to download the application to the card terminal.

26. The apparatus of claim 21 further comprising a translate module for translating the request into a format corresponding to the card terminal.

27. The apparatus of claim 21 wherein the at least one activity is at least one of a request to process the financial transaction or a closing of a batch of data associated with a plurality of financial transactions.

28. The apparatus of claim 21, wherein the processing arrangement further comprises a storage arrangement containing information associated with configuration of the card terminal.

29. The apparatus of claim 21, wherein the processing arrangement is further configure to monitor the card terminal based on receiving the request.

30. The apparatus of claim 21, wherein the at least one activity comprises at least one of a use of a debit card, a use of a credit card, a request for electronic payment, or closing of a batch of data associated with a plurality of financial transactions.

31. An apparatus for providing configuration data to a card terminal, comprising a processing arrangement configured to:
 receive information from a remote network connection relating to configuring the card terminal;
 generate from the received information configuration data for use in configuring the card terminal according to the received information;
 monitor the card terminal;
 detect at least one activity of a financial transaction performed at the card terminal; and
 transmit the configuration data to the card terminal upon detecting the at least one activity.

32. The apparatus of claim 31, further comprising a module configured to receive the information via a web page.

33. The apparatus of claim 31, further comprising a module configured to generate a data stream for transmission to the card terminal.

34. The apparatus of claim 31 wherein the information comprises at least one of (i) an indication of information to be printed on a receipt at the card terminal; (ii) an indication of audio information to be generated by the card terminal; or (iii) an indication of visual information to be displayed on the card terminal.

35. The apparatus of claim 31, further comprising a module configured to receive the information from a network connection remote from the card terminal.

36. The apparatus of claim 31, further comprising a module configured to transmit a message to the card terminal relating to triggering of downloading of the configuration data.

37. The apparatus of claim 31 wherein the at least one activity is at least one of a request to process the financial transaction or a closing of a batch of data associated with a plurality of financial transactions.

38. The apparatus of claim 31, wherein the processing arrangement further comprises a storage arrangement containing information associated with configuration of the card terminal.

39. The apparatus of claim 31, wherein the processing arrangement is further configure to monitor the card terminal based on receiving the information.

40. The apparatus of claim 31, wherein the at least one activity comprises at least one of a use of a debit card, a use of a credit card, a request for electronic payment, or closing of a batch of data associated with a plurality of financial transactions.

* * * * *